US009803969B2

(12) United States Patent
Gong

(10) Patent No.: US 9,803,969 B2
(45) Date of Patent: *Oct. 31, 2017

(54) METROLOGY DEVICE AND METHOD OF COMMUNICATING WITH PORTABLE DEVICES

(71) Applicant: FARO Technologies, Inc., Lake Mary, FL (US)

(72) Inventor: Yu Gong, Oviedo, FL (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 185 days.

This patent is subject to a terminal disclaimer.

(21) Appl. No.: 14/708,492

(22) Filed: May 11, 2015

(65) Prior Publication Data

US 2015/0330761 A1 Nov. 19, 2015

Related U.S. Application Data

(60) Provisional application No. 61/993,077, filed on May 14, 2014.

(51) Int. Cl.
*G01B 5/008* (2006.01)
*G01B 7/012* (2006.01)
(Continued)

(52) U.S. Cl.
CPC ............ *G01B 7/012* (2013.01); *G01B 5/008* (2013.01); *G01B 11/24* (2013.01); *G01S 7/003* (2013.01); *G01S 17/42* (2013.01); *G01S 17/48* (2013.01); *G01S 17/66* (2013.01); *H04B 5/0031* (2013.01); *H04B 5/0075* (2013.01); *G01B 2210/58* (2013.01)

(58) Field of Classification Search
CPC ............................... G01B 7/012; G01B 5/008
USPC ........................................................... 33/503
See application file for complete search history.

(56) References Cited

U.S. PATENT DOCUMENTS 5,332,315 A 7/1994 Baker et al.
5,402,582 A 4/1995 Raab
(Continued)

FOREIGN PATENT DOCUMENTS

DE 102005036290 A1 2/2007
DE 102012220268 A1 6/2008
(Continued)

OTHER PUBLICATIONS

International Preliminary Report on Patentability for Application No. PCT/US2015/030285 dated Nov. 15, 2016; 7 pages.
(Continued)

*Primary Examiner* — G. Bradley Bennett
(74) *Attorney, Agent, or Firm* — Cantor Colburn LLP

(57) ABSTRACT

A system is provided for communicating between a 3D metrology instrument and a portable computing device via near field communications. In one embodiment, the metrology device is an articulated coordinate measurement machine (AACMM), a laser tracker, a laser scanner or a triangulation scanner, and the portable communications device is a cellular phone or a tablet. The portable device may use the NFC to establish longer range communications modules, to change or establish settings and parameters or control the metrology device.

23 Claims, 18 Drawing Sheets

(51) Int. Cl.

| | |
|---|---|
| ***G01B 11/24*** | (2006.01) |
| ***G01S 7/00*** | (2006.01) |
| ***G01S 17/42*** | (2006.01) |
| ***G01S 17/48*** | (2006.01) |
| ***G01S 17/66*** | (2006.01) |
| ***H04B 5/00*** | (2006.01) |

(56) References Cited

U.S. PATENT DOCUMENTS

| | | | | |
|---|---|---|---|---|
| 6,357,134 | B1 | 3/2002 | Hama et al. | |
| 6,370,789 | B1 | 4/2002 | Madlener et al. | |
| 7,073,271 | B2 | 7/2006 | Raab et al. | |
| 7,246,030 | B2 | 7/2007 | Raab et al. | |
| 7,735,234 | B2 | 6/2010 | Briggs et al. | |
| 7,881,896 | B2 | 2/2011 | Atwell et al. | |
| 8,104,189 | B2 | 1/2012 | Tait | |
| 8,152,071 | B2 | 4/2012 | Doherty et al. | |
| 8,171,650 | B2 | 5/2012 | York et al. | |
| 8,220,173 | B2 | 7/2012 | Tait | |
| 8,467,072 | B2 | 6/2013 | Cramer et al. | |
| 8,515,413 | B1 | 8/2013 | Schilit et al. | |
| 8,537,376 | B2 | 9/2013 | Brown et al. | |
| 8,593,648 | B2 | 11/2013 | Cramer et al. | |
| 8,724,119 | B2 | 5/2014 | Steffey et al. | |
| 8,898,919 | B2 * | 12/2014 | Bridges | G01B 21/047 33/503 |
| 9,651,361 | B2 | 5/2017 | York et al. | |
| 9,664,508 | B2 | 5/2017 | Mcafee et al. | |
| 9,739,591 | B2 | 8/2017 | Gong | |
| 2008/0016711 | A1 | 1/2008 | Baebler | |
| 2009/0013548 | A1 | 1/2009 | Ferrari | |
| 2009/0187373 | A1 * | 7/2009 | Atwell | B25J 9/1692 702/152 |
| 2010/0250175 | A1 | 9/2010 | Briggs et al. | |
| 2011/0107611 | A1 | 5/2011 | Desforges et al. | |
| 2011/0173827 | A1 | 7/2011 | Bailey et al. | |
| 2011/0176148 | A1 | 7/2011 | Briggs et al. | |
| 2011/0260033 | A1 | 10/2011 | Steffensen et al. | |
| 2012/0144685 | A1 | 6/2012 | Atwell et al. | |
| 2012/0262550 | A1 | 10/2012 | Bridges | |
| 2013/0019087 | A1 | 1/2013 | Osaki et al. | |
| 2013/0091720 | A1 | 4/2013 | Hayashida | |
| 2013/0097882 | A1 | 4/2013 | Bridges et al. | |
| 2013/0101953 | A1 | 4/2013 | Stone et al. | |
| 2013/0125408 | A1 | 5/2013 | Atwell et al. | |
| 2013/0190897 | A1 | 7/2013 | Junk et al. | |
| 2013/0197852 | A1 | 8/2013 | Grau et al. | |
| 2013/0205606 | A1 | 8/2013 | Briggs et al. | |
| 2013/0286196 | A1 | 10/2013 | Atwell | |
| 2014/0098381 | A1 | 4/2014 | Bridges | |
| 2014/0098382 | A1 | 4/2014 | Bridges et al. | |
| 2014/0101953 | A1 | 4/2014 | Briggs et al. | |
| 2014/0215841 | A1 | 8/2014 | Danbury et al. | |
| 2014/0226145 | A1 | 8/2014 | Steffey et al. | |
| 2014/0268108 | A1 * | 9/2014 | Grau | G01B 5/008 356/72 |
| 2014/0268178 | A1 * | 9/2014 | Atwell | G01B 11/24 356/614 |
| 2014/0313521 | A1 | 10/2014 | Bridges | |
| 2015/0002659 | A1 | 1/2015 | Atwell et al. | |
| 2015/0009161 | A1 | 1/2015 | Park et al. | |
| 2015/0049329 | A1 | 2/2015 | Bridges et al. | |
| 2015/0075018 | A1 | 3/2015 | Bridges et al. | |
| 2015/0143707 | A1 | 5/2015 | Goto | |
| 2015/0211847 | A1 | 7/2015 | Abe et al. | |
| 2015/0253125 | A1 | 9/2015 | Pettersson | |
| 2015/0285615 | A1 | 10/2015 | Bridges | |
| 2015/0330761 | A1 * | 11/2015 | Gong | G01B 7/012 33/503 |
| 2015/0330762 | A1 | 11/2015 | Gong | |
| 2015/0330763 | A1 | 11/2015 | Gong | |
| 2015/0330764 | A1 | 11/2015 | Gong | |
| 2015/0330765 | A1 * | 11/2015 | Gong | G01B 7/012 33/503 |
| 2015/0330766 | A1 * | 11/2015 | Gong | G06F 8/65 33/503 |
| 2015/0354942 | A1 | 12/2015 | Bridges | |
| 2015/0355310 | A1 | 12/2015 | Gong | |
| 2015/0362305 | A1 | 12/2015 | Ferrari et al. | |
| 2016/0084633 | A1 * | 3/2016 | Ferrari | G01B 21/04 33/503 |
| 2016/0097629 | A1 | 4/2016 | York et al. | |
| 2016/0102965 | A1 | 4/2016 | York et al. | |
| 2016/0146589 | A1 | 5/2016 | Jonas et al. | |
| 2016/0153767 | A1 | 6/2016 | Ihlenfeldt | |
| 2016/0320169 | A1 | 11/2016 | Becker et al. | |
| 2016/0349034 | A1 | 12/2016 | Cobb et al. | |
| 2017/0131086 | A1 | 5/2017 | York et al. | |

FOREIGN PATENT DOCUMENTS

| | | | |
|---|---|---|---|
| EP | 1750185 | A2 | 2/2007 |
| EP | 2178023 | A2 | 4/2010 |
| EP | 2384851 | A1 | 11/2011 |
| WO | 2006109032 | A1 | 10/2006 |
| WO | 2008027588 | A2 | 3/2008 |
| WO | 2008070854 | A1 | 6/2008 |
| WO | 2013182909 | A1 | 12/2013 |

OTHER PUBLICATIONS

Notification of Transmittal of the International Search Report and the Written Opinion of the International Searching Authority for International Application No. PCT/US2015/030263 dated Jul. 16, 2015; Mailed Aug. 3, 2015; 11 pages.

Notification of Transmittal of the International Search Report and the Written Opinion of the International Searching Authority for International Application No. PCT/US2015/030266 dated Jul. 22, 2015; Mailed Aug. 3, 2015; 11 pgs.

Notification of Transmittal of the International Search Report and the Written Opinion of the International Searching Authority for International Application No. PCT/US2015/030281 dated Jul. 20, 2015; Mailed Aug. 3, 2015; 11 pgs.

Notification of Transmittal of the International Search Report and the Written Opinion of the International Searching Authority for International Application No. PCT/US2015/030283 dated Jul. 24, 2015; Mailed Aug. 3, 2015; 12 pgs.

Notification of Transmittal of the International Search Report and the Written Opinion of the International Searching Authority for International Application No. PCT/US2015/030284 dated Aug. 4, 2015; Mailed Aug. 3, 2015; 10 pgs.

Notification of Transmittal of the International Search Report and the Written Opinion of the International Searching Authority for International Application No. PCT/US2015/030285 dated Jul. 20, 2015; Mailed Aug. 3, 2015; 11 pgs.

* cited by examiner

METROLOGY DEVICE AND METHOD OF COMMUNICATING WITH PORTABLE DEVICES

CROSS-REFERENCE TO RELATED APPLICATIONS

The Present Application is a Nonprovisional Application of Provisional Application Ser. No. 61/993,077 filed on May 14, 2014, the contents of which are incorporated herein by reference.

BACKGROUND OF THE INVENTION

The present disclosure relates to metrology instruments that measure the three-dimensional coordinates of points on an object, and more particularly, to a metrology instrument having near field communications (NFC) capability to communicate with one or more external devices.

Metrology instruments, such as portable articulated arm coordinate measuring machines (AACMMs), laser trackers, laser scanners and triangulation scanners for example, have found widespread use in the manufacturing or production of parts where there is a need to rapidly and accurately verify the dimensions of the part during various stages of the manufacturing or production (e.g., machining). Portable metrology instruments represent a vast improvement over known stationary or fixed, cost-intensive and relatively difficult to use measurement installations, particularly in the amount of time it takes to perform dimensional measurements of relatively complex parts. In the instance of a portable AACMM, the user simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

Accordingly, while existing metrology instruments are suitable for their intended purposes the need for improvement remains, particularly in providing a method and apparatus for communicating between the metrology instrument and a device to allow the operator to control a metrology instrument, configure the metrology instrument, or change parameters on the metrology instrument.

BRIEF DESCRIPTION OF THE INVENTION

In accordance with an embodiment, a metrology device is provided. The metrology device including a housing and a measurement device operably coupled to the housing. The measurement device being configured to measure an object. A wireless communications device operably is coupled to the housing, the wireless communications device having an antenna, an electrical circuit and a first memory. The electrical circuit and the antenna being configured to cooperate to modulate an operating field generated by an external device, wherein the electrical circuit is configured to receive a first data from the external device and store the received first data in the first memory. The electrical circuit is further configured to transmit a second data to the external device through the modulation of the operating field. An electronic processing system is operably coupled to the measurement device. The electronic processing system is configured to determine three-dimensional (3D) coordinates of at least one point on a surface of the object based at least in part on a measurement of the object by the measurement device.

In accordance with another embodiment of the invention, a method is provided. The method including the steps of: providing a metrology device having a housing and a measurement device operably coupled to the housing, the measurement device configured to measure an object, the metrology device further having a wireless communications circuit having an antenna, an electrical circuit and a memory, the metrology device still further having an electronic processing system operably coupled to the measurement device and configured to determine 3D coordinates of at least one point on the object based on a measurement by the measurement device; providing a portable computing device having a processor, a second memory, a transmitter, and a receiver; transmitting an operating field with the transmitter; moving the portable computing device within a predetermined distance of the wireless communications circuit; receiving the operating field with the antenna; receiving at the electrical circuit a first signal from the antenna in response to receiving the operating field; and modulating the operating field with the antenna to transmit data from the electrical circuit to the receiver.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

An embodiment of the present invention provides communicating between a 3D metrology instrument and a portable device, such as a phone, a tablet or another metrology instrument. Embodiments of the invention provide advantages in facilitating the configuration of settings, such as wireless communications parameters, in the metrology device. Embodiments of the invention provide advantages in allowing the remote control of the metrology device with a portable device. Embodiments of the invention provide still further advantages in allowing the wireless updating of boot load code for the metrology device by an operator. Further embodiments of the invention provide advantages in assignment of identification codes in position transducers through a near field communications circuit. Still further embodiments of the invention provide advantages in allowing service personnel to quickly determine configuration information of the metrology instrument. In still further embodiments of the invention advantages are gained in providing a near field communications device that functions as a powerless switch to eliminate mechanical components such as slip rings.

FIGS. 1-4 illustrate exemplary metrology instruments, including an articulated arm coordinate measurement (AACMM) device 100, a laser tracker device 200, a time-of-flight (TOF) laser scanner device 300 and a triangulation scanning device 400 (collectively referred to herein as metrology devices) for example, according to various embodiments of the present invention. It should be appreciated that while embodiments herein may refer to specific metrology devices, the claimed invention should not be so limited. In other embodiments, the various embodiments may be used in other metrology devices, such as but not limited to laser line probes, total stations and theodolites for example.

Figure 1:
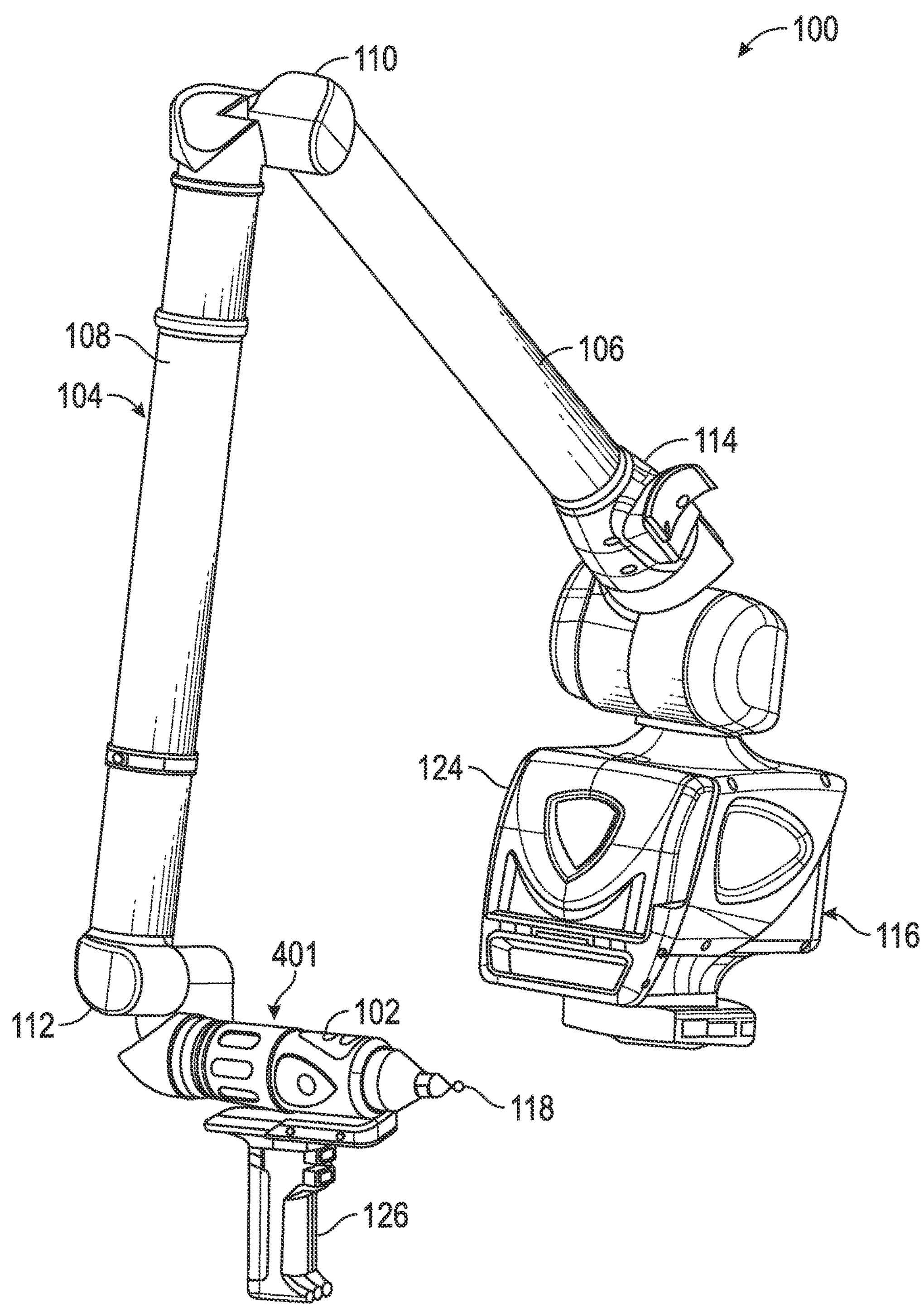
FIG. 1 is a perspective view of a portable articulated arm coordinate measuring machine (AACMM) having embodiments of various aspects of the present invention.

Referring now to FIG. 1, an AACMM 100 according to various embodiments of the present invention, an articulated arm being one type of coordinate measuring machine. The AACMM 100 may be the same as that described in commonly owned U.S. Pat. No. 8,533,967 entitled "Coordinate Measurement Machine," the contents of which are incorporated herein by reference. The exemplary AACMM 100 may comprise a six or seven axis articulated measurement device having a probe end 401 that includes a measurement probe housing 102 coupled to an arm portion 104 of the AACMM 100 at one end.

The arm portion 104 comprises a first arm segment 106 coupled to a second arm segment 108 by a rotational connection having a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 401 may include a measurement probe housing 102 that comprises the shaft of the seventh axis portion of the AACMM 100 (e.g., a cartridge containing an encoder system that determines movement of the measurement device, for example a contact probe 118, in the seventh axis of the AACMM 100). In this embodiment, the probe end 401 may rotate about an axis extending through the center of measurement probe housing 102. In use the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference).

The probe 118 is detachably mounted to the measurement probe housing 102, which is connected to bearing cartridge grouping 112. A handle accessory 126 may be removable with respect to the measurement probe housing 102 by way of, for example, a quick-connect interface. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of accessory devices may replace the removable handle 126 to provide additional functionality. Examples of such accessory devices include, but are not limited to, one or more illumination lights, a temperature sensor, a thermal scanner, a bar code scanner, a projector, a paint sprayer, a camera, a video camera, an audio recording system or the like, for example.

In accordance with an embodiment, the base 116 of the portable AACMM 100 contains or houses an electronic data processing system that includes a base processing system that processes the data from the various encoder systems within the AACMM 100 as well as data representing other arm parameters to support three-dimensional (3-D) positional calculations, and resident application software that allows for relatively complete metrology functions to be implemented within the AACMM 100.

As will be discussed in more detail below, the electronic data processing system 500 in the base 116 may communicate with the encoder systems, sensors, and other peripheral hardware located away from the base 116 (e.g., a LLP that can be mounted to or within the removable handle 126 on the AACMM 100). The electronics that support these peripheral hardware devices or features may be located in each of the bearing cartridge groupings 110, 112, 114 located within the portable AACMM 100. As will be discussed in more detail herein, each of the angular encoders within the bearing cartridge groupings 110, 112, 114 includes a definable identification number that allows the electronic data processing system to determine which angular encoder transmitted a positional signal and also compensate for known calibration errors in the particular encoder. The 3-D positional calculations may be determined at least in part on positional signal that includes the angular encoder identification number.

Figure 2:
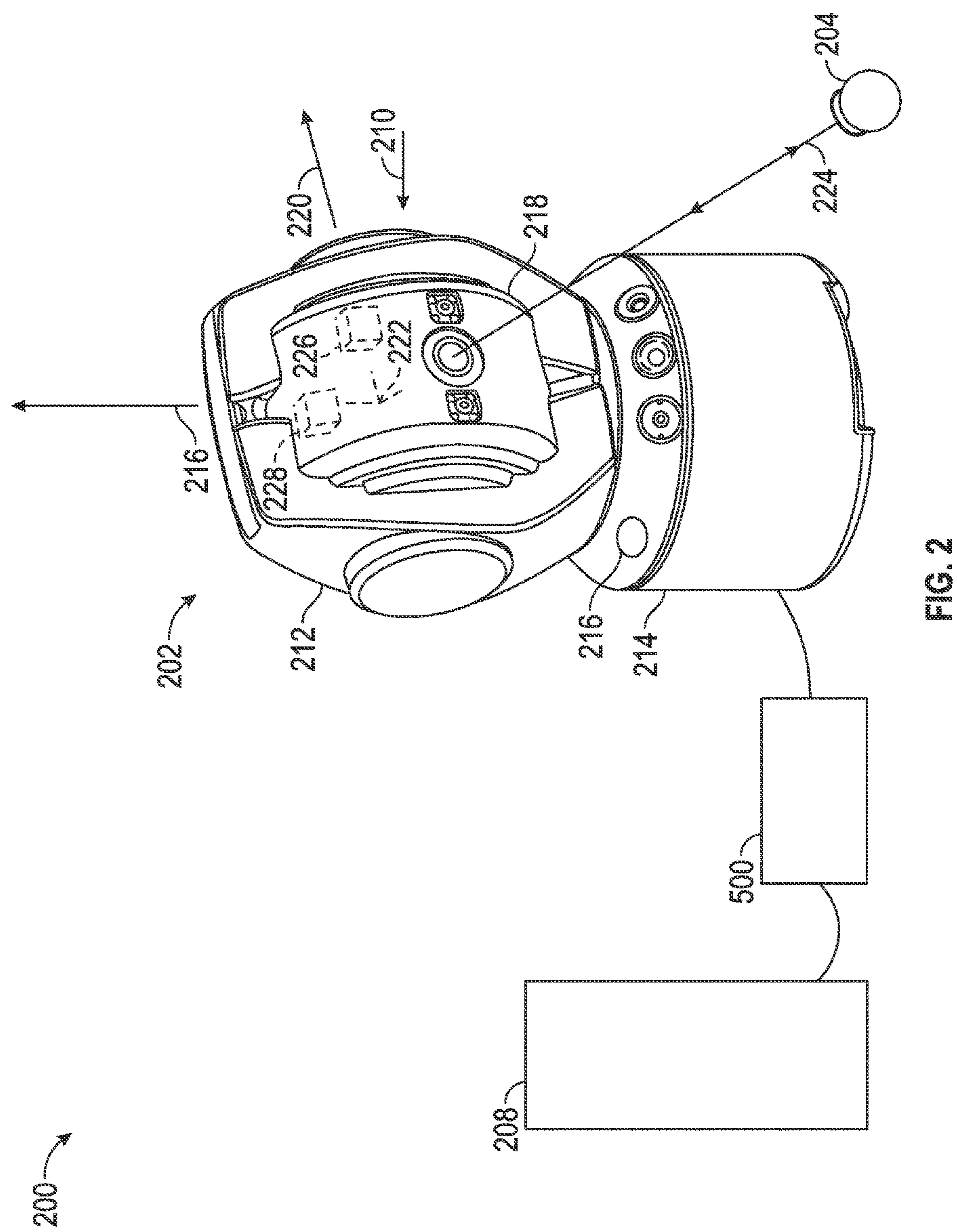
FIG. 2 is a perspective view of a laser tracker device having embodiments of various aspects of the present invention.

An exemplary laser tracker system 200 illustrated in FIG. 2 includes a laser tracker 202, a retroreflector target 204, an electronic data processing system 500, and an optional auxiliary computer 208. The laser tracker 200 may be similar to that described in commonly owned U.S. Provisional Application Ser. No. 61/842,572 filed on Jul. 3, 2013, the contents of which are incorporated herein by reference. It should be appreciated that while the electronic data processing system is illustrated external to the laser tracker 200, this is for exemplary purposes and the electronic data processing system 500 may be arranged within the housing of the laser tracker 200. An exemplary gimbaled beam-steering mechanism 210 of laser tracker 200 comprises a zenith carriage 212 mounted on an azimuth base 214 and rotated about an azimuth axis 216. A payload 218 is mounted on the zenith carriage 212 and rotated about a zenith axis 220. Zenith axis 220 and azimuth axis 216 intersect orthogonally, internally to tracker 200, at gimbal point 222, which is typically the origin for distance measurements.

A laser beam 224 virtually passes through the gimbal point 222 and is pointed orthogonal to zenith axis 220. In other words, laser beam 224 lies in a plane approximately perpendicular to the zenith axis 220 and that passes through the azimuth axis 216. Outgoing laser beam 224 is pointed in the desired direction by rotation of payload 218 about zenith axis 220 and by rotation of zenith carriage 212 about azimuth axis 216. A zenith angular encoder 226, internal to the tracker 220, is attached to a zenith mechanical axis aligned to the zenith axis 220. An azimuth angular encoder 228, internal to the tracker, is attached to an azimuth mechanical axis aligned to the azimuth axis 216. The zenith and azimuth angular encoders 226, 228 measure the zenith and azimuth angles of rotation to relatively high accuracy. Outgoing laser beam 224 travels to the retroreflector target 204, which might be, for example, a spherically mounted retroreflector (SMR).

By measuring the radial distance between gimbal point 222 and retroreflector 204, the rotation angle about the zenith axis 220, and the rotation angle about the azimuth axis 216, the position of retroreflector 204 and thus the three-dimensional coordinates of the object being inspected is found by the electronic data processing system 500 within the local spherical coordinate system of the tracker.

Figure 3:
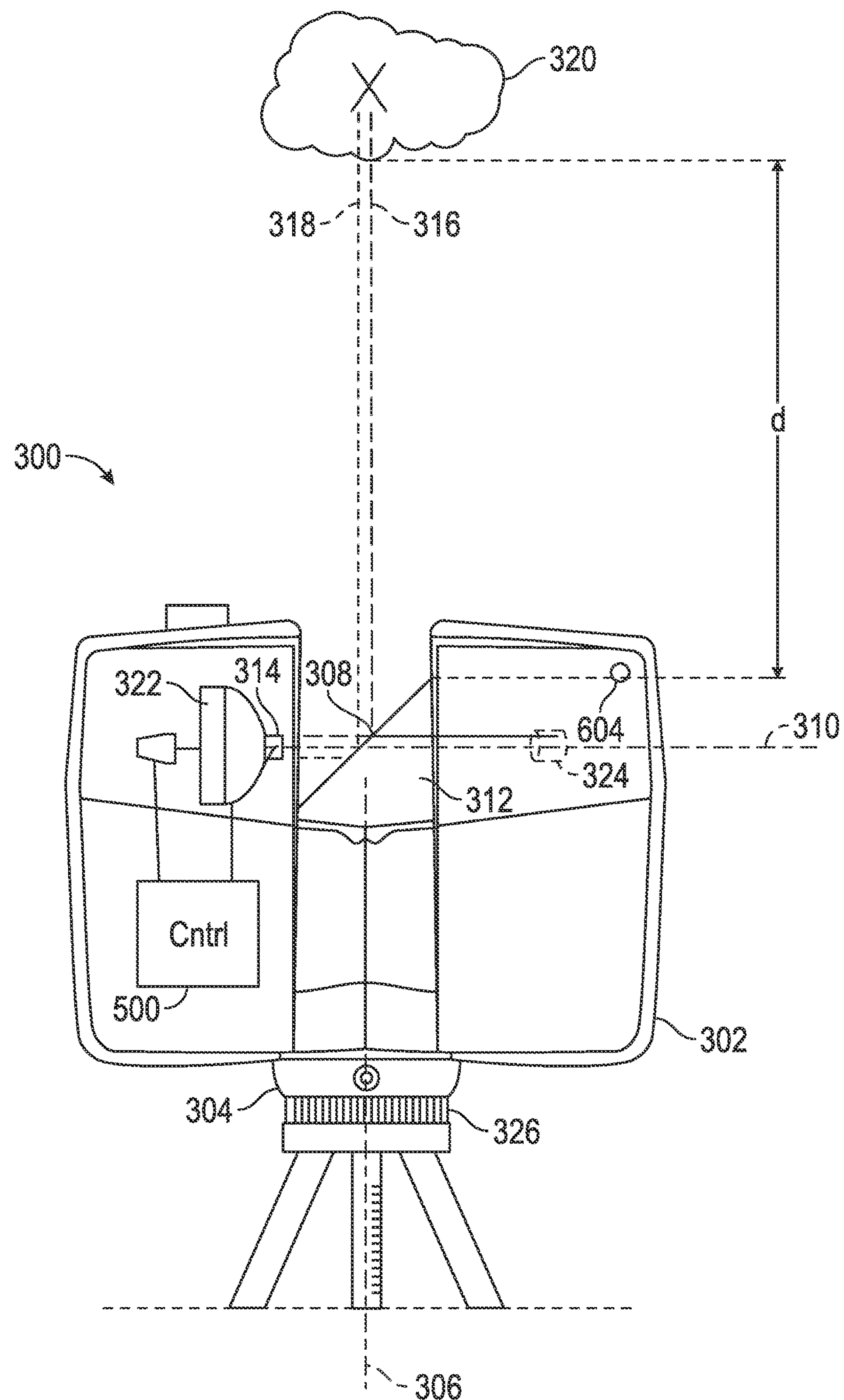
FIG. 3 is a side view of a laser scanner having embodiments of various aspects of the present invention.

Referring now to FIG. 3, an exemplary laser scanner 300 is shown in accordance with embodiment of the invention. The laser scanner 300 has a measuring head 302 and a base 304. The laser scanner 300 may be similar to that described in commonly owned United States Patent Publication 2014/0078519 entitled "Laser Scanner," the contents of which are incorporated by reference herein. The measuring head 302 is mounted on the base 304 such that the laser scanner 300 may be rotated about a vertical axis 306. In one embodiment, the measuring head 302 includes a gimbal point 308 that is a center of rotation about a vertical axis 306 and a horizontal axis 310. In an embodiment, the measuring head 302 has a rotary mirror 312, which may be rotated about a horizontal axis 310. The rotation about the vertical axis may be about the center of the base 304. In an embodiment, the vertical (azimuth) axis 306 and the horizontal (zenith) axis 310 intersect at the gimbal point 308, which may be an origin of a coordinate system.

The measuring head 302 is further provided with an electromagnetic radiation emitter, such as light emitter 314 for example, that emits an emitted light beam 316. In one embodiment, the emitted light beam 316 is coherent light, such as a laser beam for example. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 316 may be amplitude or intensity modulated, for example, with a sinusoidal waveform or with a rectangular waveform. The emitted light beam 316 is emitted by the light emitter 314 onto the rotary mirror 312, where it is deflected to the environment. A reflected light beam 318 is reflected from the environment by an object 320. The reflected or scattered light is intercepted by the rotary mirror 312 and directed into a light receiver 322. The directions of the emitted light beam 316 and the reflected light beam 318 result from the angular positions of the rotary mirror 312 and the measuring head 302 about the axis 306 and axis 310, respectively. These angular positions in turn depend on the rotary drives that cause rotations of the rotary mirror 312 and the measuring head 302 about the axis 310 and axis 306, respectively. Each of the axes 310, 306 include at least one angular transducer 324, 326 for measuring angle. The angular transducer may be an angular encoder.

Coupled to the light emitter 314 and the light receiver 322 is an electronic data processing system 500. The electronic data processing system 328 determines, for a multitude of surface points X, a corresponding number of distances d between the laser scanner 300 and surface points X on object 320. The distance to a particular surface point X is determined based at least in part on the speed of light in air through which electromagnetic radiation propagates from the device to the surface point X. In one embodiment the phase shift between the laser scanner 300 and the surface point X is determined and evaluated to obtain a measured distance "d". In another embodiment, the elapsed time between laser pulses is measured directly to determine a measured distance "d."

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum "c" divided by the index of refraction. In other words, $c_{air}=c/n$. A laser scanner of the type discussed herein is based on the time-of-flight of the light in the air (the round-trip time for the light to travel from the device to the object and back to the device). A method of measuring distance based on the time-of-flight of light (or any type of electromagnetic radiation) depends on the speed of light in air.

In an embodiment, the scanning of the volume about the laser scanner 300 takes place by quickly rotating the rotary mirror 312 about axis 310 while slowly rotating the measuring head 302 about axis 306, thereby moving the assembly in a spiral pattern. For such a scanning system, the gimbal point 308 defines the origin of the local stationary reference system. The base 304 rests in a local stationary frame of reference.

Figure 4:
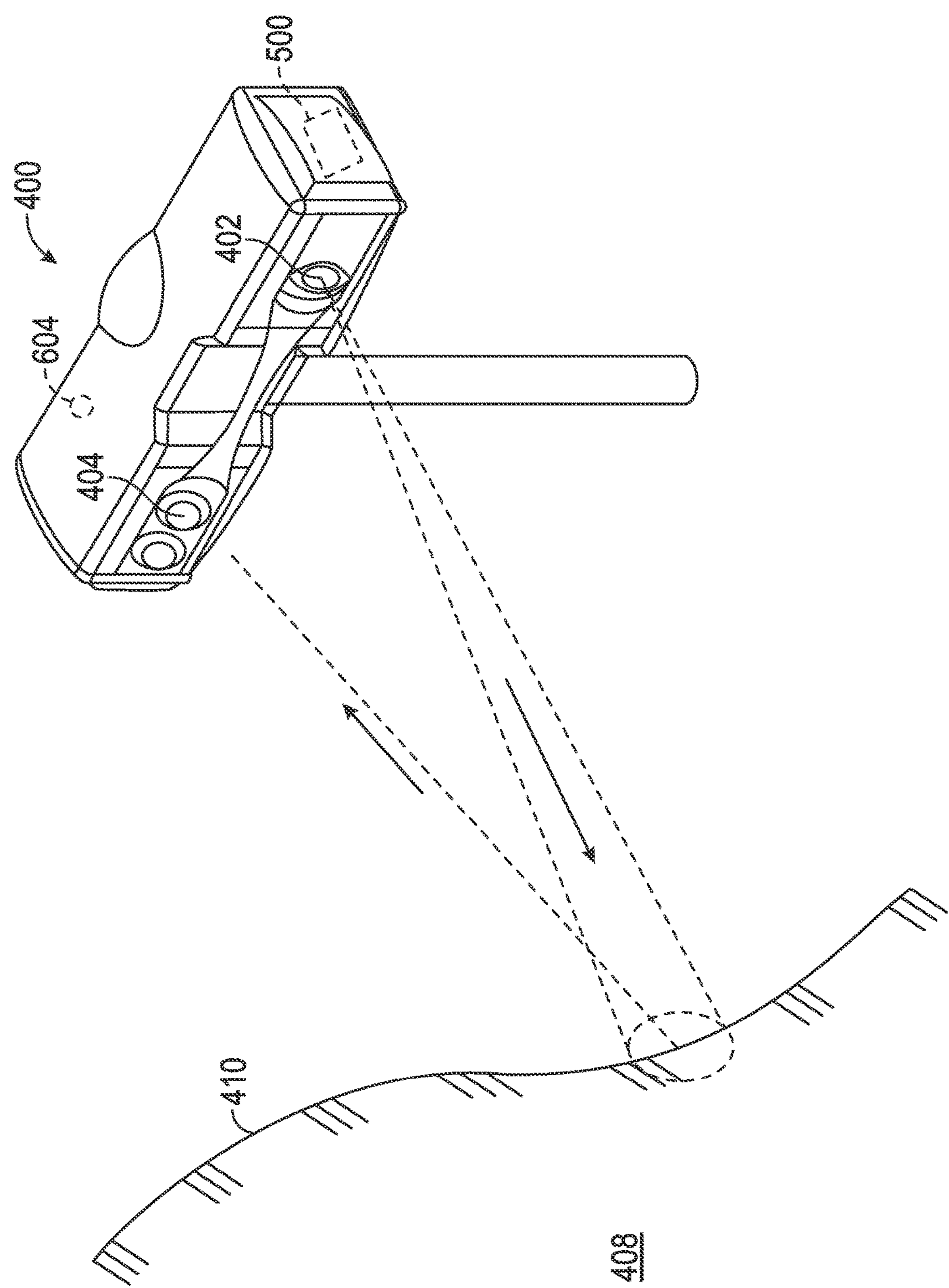
FIG. 4 is a perspective view of a three-dimensional (3D) triangulation scanner having embodiments of various aspects of the present invention.

Referring now to FIG. 4, an embodiment of a triangulation scanner 400 is shown that includes a light source 402 and at least one camera 404 and an electronic data processing system 500 that determines the three dimensional coordinates of points on the surface 410 of an object 408. The triangulation scanner may the same as that described in commonly owned U.S. patent application Ser. No. 14/139,021 filed on Dec. 23, 2013, the contents of which are incorporated herein by reference. A triangulation scanner 400 is different than a laser tracker 200 or a TOF laser scanner 300 in that the three-dimensional coordinates are determined based on triangulation principals related to the fixed geometric relationship between the light source 402 and the camera 404 rather than on the speed of light in air.

In general, there are two common types of triangulation scanners 400. The first type, sometimes referred to as a laser line probe or laser line scanner, projects the line or a swept point of light onto the surface 410. The reflected laser light is captured by the camera 404 and in some instances, the coordinates of points on the surface 410 may be determined. The second type, sometimes referred to as a structured light scanner, projects a two-dimensional pattern of light or multiple patterns of light onto the surface. The three-dimensional profile of the surface 410 affects the image of the pattern captured by the photosensitive array 38 within the camera 404. Using information collected from one or more images of the pattern or patterns, the electronic data processing system 406 can in some instances determine a one-to-one correspondence between the pixels of the photosensitive array in camera 404 and the pattern of light emitted by the light source 402. Using this one-to-one correspondence together with a baseline distance between the camera and the projector, triangulation principals are used by electronic data processing system 500 to determine the three-dimensional coordinates of points on the surface 410. By moving the triangulation scanner 400 relative to the surface 410, a point cloud may be created of the entire object 408.

In general, there are two types of structured light patterns, a coded light pattern and an uncoded light pattern. As used herein the term coded light pattern refers to a pattern in which three dimensional coordinates of an illuminated surface of the object are based on single projected pattern and a single corresponding image. With a coded light pattern, there is a way of establishing a one-to-one correspondence between points on the projected pattern and points on the received image based on the pattern itself Because of this property, it is possible to obtain and register point cloud data while the projecting device is moving relative to the object. One type of coded light pattern contains a set of elements (e.g. geometric shapes) arranged in lines where at least three of the elements are non-collinear. Such pattern elements are recognizable because of their arrangement. In contrast, as used herein, the term uncoded structured light pattern refers to a pattern that does not allow 3D coordinates to be determined based on a single pattern. A series of uncoded light patterns may be projected and imaged sequentially, with the relationship between the sequence of obtained images used to establish a one-to-one correspondence among projected and imaged points. For this embodiment, the triangulation scanner 400 is arranged in fixed position relative to the object 408 until the one-to-one correspondence has been established.

It should be appreciated that the triangulation scanner 400 may use either coded or uncoded structured light patterns. The structured light pattern may include the patterns disclosed in the journal article "DLP-Based Structured Light 3D Imaging Technologies and Applications" by Jason Geng published in the Proceedings of SPIE, Vol. 7932, which is incorporated herein by reference.

Collectively, the metrology instruments such as the AACMM 100, the laser tracker 200, the TOF laser scanner 300 and the triangulation scanner 400 are referred to herein as metrology devices. It should be appreciated that these metrology instruments are exemplary and the claimed invention should not be so limited, as the systems and methods disclosed herein may be used with any metrology instrument configured to measure three-dimensional coordinates of an object.

Figure 5:
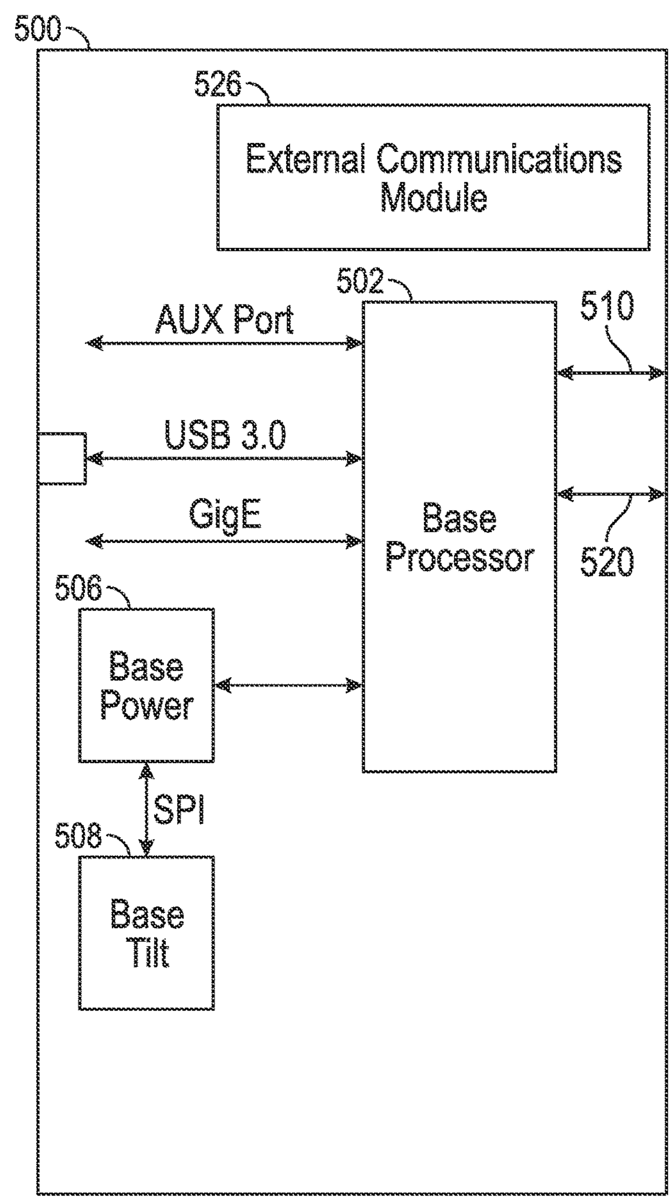
FIG. 5 is a block diagram of electronics utilized as part of the metrology instruments of FIGS. 1-4 in accordance with an embodiment.

FIG. 5 is a block diagram of an embodiment of an electronic data processing system 500 utilized in metrology devices 100, 200, 300, 400 in accordance with an embodiment. The electronic data processing system 500 includes a base processor board 502 for implementing the base processing system, a communications module 526, a base power board 506 for providing power, and a base tilt board 508. As will be discussed in more detail below, the communications module 526 may include one or more submodules, such as a near field communications circuit (NFC), a cellular teleconference circuit (including LTE, GSM, EDGE, UMTS, HSPA and 3GPP cellular network technologies), a Bluetooth® (IEEE 802.15.1 and its successors) circuit and a Wi-Fi (IEEE 802.11) circuit for example.

In embodiments, the metrology device 100, 200, 300 includes one or more encoders, and the electronic data processing system 500 for the metrology device is in communication with the aforementioned plurality of encoder systems via one or more electrical busses 510. The metrology device 100, 200, 300, 400 may further include an optical bus 520 in communication with the electronic data processing system 500. It should be appreciated that the data processing system 500 may include additional components, such as connectors, terminals or circuits, for example, which are configured to adapt the incoming and outgoing signals to busses 510, 520. For the clarity purposes, not all of these components are shown in FIG. 5.

Figure 6:
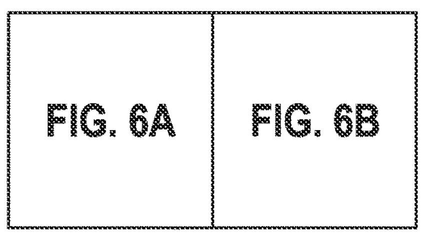
FIG. 6, including FIGS. 6A and 6B taken together, is a block diagram describing detailed features of the electronic data processing system of FIG. 5 in accordance with an embodiment.
Figure 6A:
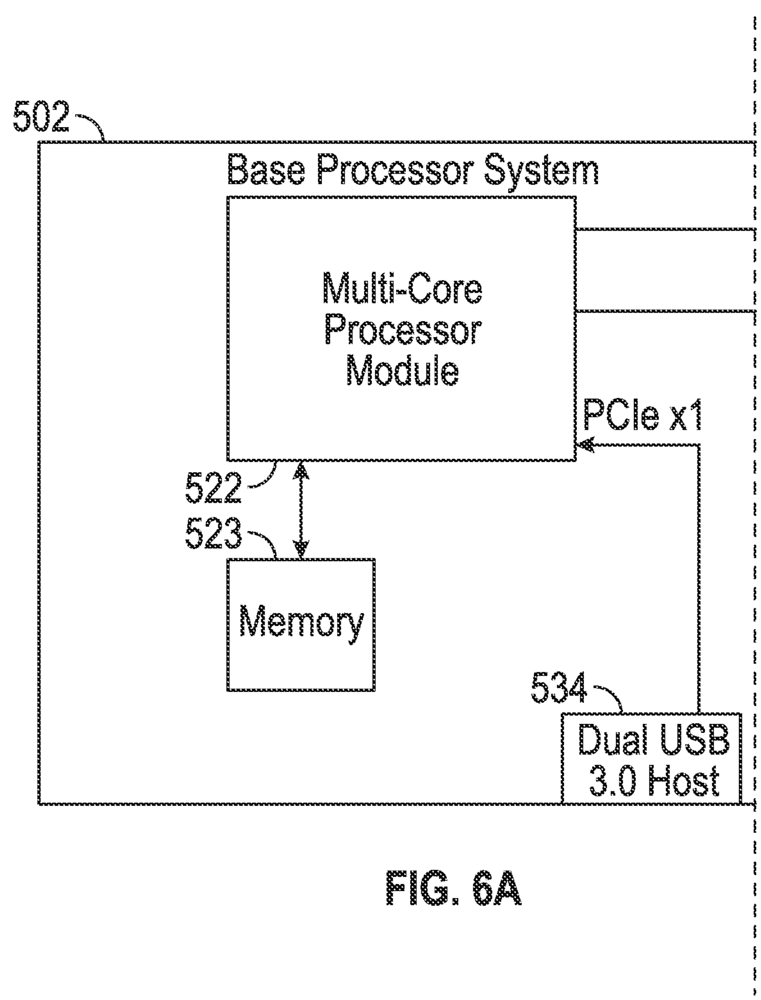
Figure 6B:
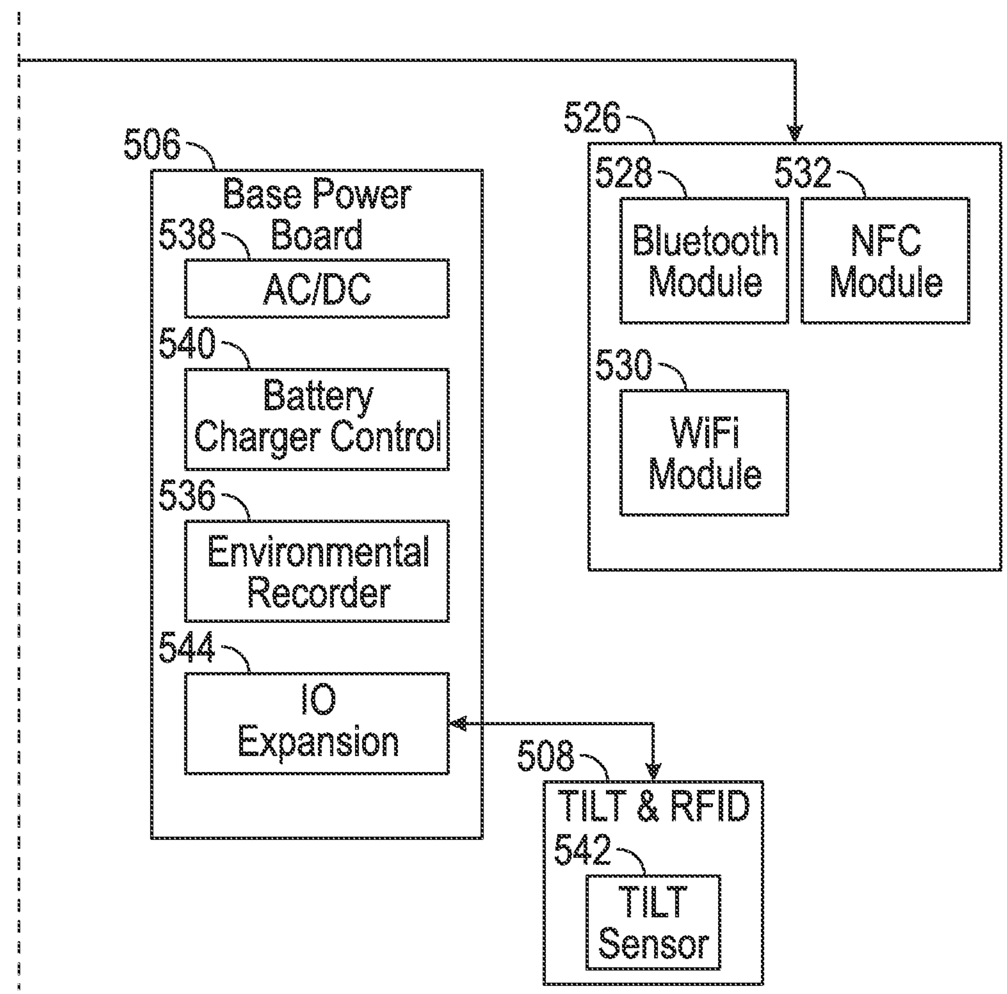

FIGS. 6A-6B are block diagrams describing features of the electronic data processing system 500 of the metrology device 100, 200, 300, 400 in accordance with an embodiment. In an embodiment, the electronic data processing system 500 is located internally within a housing of the metrology device and includes the base processor board 502 a base power board 506, a communications module 526, and a base tilt module 508.

The base processor board 502 includes the various functional blocks illustrated therein. For example, a base processor function 522 is utilized to support the collection of measurement data from the metrology device and receives raw metrology data (e.g., encoder system or time of flight data), such as via electrical bus 510. The memory function 523 stores programs and static metrology device configuration data. As will be discussed in detail below, in some embodiments the static configuration data may be stored in memory associated with an NFC module on the communications module 526. The base processor board 502 may also include an external hardware option port functions for communicating with any external hardware devices or accessories such as but not limited to a graphical monitor or television via HDMI port, an audio device port, a USB 3.0 port and a flash memory (SD) card via port for example.

The base processor board 502 may also manage all the wired and wireless data communication with an external computing device. The base processor board 502 has the capability of communicating with an Ethernet network via a gigabit Ethernet function (e.g., using a clock synchronization standard such as Institute of Electrical and Electronics Engineers (IEEE) 1588), with a wireless local area network via communications module 526. The communications module 526 may include a Bluetooth module 528, a WiFi module 530 and a near field communications (NFC) module 532. It should be appreciated that the communications module 526 may include other communications related circuits or modules and the modules described herein are exemplary and not intended to be limiting.

In the illustrated embodiment, the NFC module 532 is a dual-interface memory/tag device such as the M24SR series NFC tags manufactured by ST Microelectronics N.V. for example. A dual-interface memory device includes a wireless port that communicates with an external NFC reader, and a wired port that connects the device with another circuit, such as base processor board 502. As will be discussed in more detail below, the use of a dual-interface memory device provides advantages allowing the NFC module 532 to interact with or control functionality of the base processing board 502. In one embodiment, the NFC module 532 includes the boot load code, the executable code used by the processor 522 during operation initiation (initial power-on state of operation). By storing the boot load code in the memory of NFC module 532, this executable code may be upgraded or replaced by the end-user using the NFC communications medium rather than involving service personnel.

In another embodiment, the NFC module 532 is a single port NFC tag, such as MIFARE Classic Series manufactured by NXP Semiconductors. With a single port tag, the module 532 is not electrically coupled to the base processor board 502. In this embodiment, the NFC module 532 stores a set of device data regarding the metrology device, such as but not limited to: serial number, configuration, revision data or encoder identification data for example. This provides advantages in allowing the user or service personnel to quickly identify the metrology device. Further, this data may be used with a portable computing device to automatically associate the measurements made by the metrology device with the serial number of the instrument to allow tracing of the measurements to a particular instrument. It should be appreciated that in this embodiment, the NFC module 532 may be integrated onto the same board as the other modules as illustrated, or may be mounted separately. In one embodiment, the NFC module 532 is mounted to an adhesive label that is coupled to the outside of the metrology device.

Further, it should be appreciated that while FIG. 6 illustrates the communications module as having a single connection, this is for exemplary purposes and the connections from the sub-modules 528, 530, 532 to the base processor board 502 may include several connections, such as but not limited to a parallel to serial communications (PSC) function. The base processor board 502 also includes a connection to a universal serial bus (USB 3.0) device 534.

The base processor board 502 transmits and collects raw measurement data (e.g., encoder system counts, temperature readings) for processing into measurement data without the need for any preprocessing. As will be discussed in more detail herein, the base processor 502 sends the processed data to an external computing device via a wired Ethernet interface, USB interface 534 or communications module 526. In an embodiment, the base processor 502 also sends the raw measurement data to the external computing device.

Turning now to the communications module 526, this module allows the base processor 502 to wirelessly transmit and receive signals from one or more computing devices, such as a portable computing device. These portable computing devices may include but is not limited to a cellular phone, a tablet computer, a wearable computer or a laptop for example. The external wearable device may be, for example, glasses having a display that shows the user the data/information from the metrology device as described herein. The wearable device may also be a watch with a display that shows the user data/information from the metrology device. The wearable device may further be an article such as a badge, ring, broach or pendant, that displays information from the metrology device. It should be appreciated that these wearable devices may also indicate or display a subset of the data/information, for example, a ring may have an indicator that changes color based on a measurement parameter (e.g. the measurement was successfully acquired). The wearable device and other portable computing devices each have a processor and memory that is configured to execute computer instructions on the respective processor to perform the functions described herein.

The communications module 526 may transmit the angle and positional data received by the base processor and utilize it with applications executing on a portable computing device to provide a portable and autonomous metrology system that operates with the metrology device. Applications may be executed on the portable computing device to support functions such as, but not limited to: measurement of features, guidance and training graphics, remote diagnostics, temperature corrections, control of various operational features, connection to various networks, and display of measured objects.

The electronic data processing system 500 may also include a base power board 506 with an environmental recorder 536 for recording environmental data. The base power board 506 also provides power to the electronic data processing system 500 using an AC/DC converter 538 and a battery charger control 540. The base power board 506 communicates with the base processor board 502 using inter-integrated circuit (I2C) serial single ended bus as well as via a DMA serial peripheral interface (DSPI). The base power board 506 is connected to a tilt sensor 542 via an input/output (I/O) expansion function 544 implemented in the base power board 506.

Though shown as separate components, in other embodiments all or a subset of the components may be physically located in different locations and/or functions combined in different manners than that shown in FIG. 6. For example, in one embodiment, the base processor board 502 is shielded to reduce radio frequency (RF) interference and the communications module board 526 is disposed outside of the shielding to allow communication with external devices.

Figure 7:
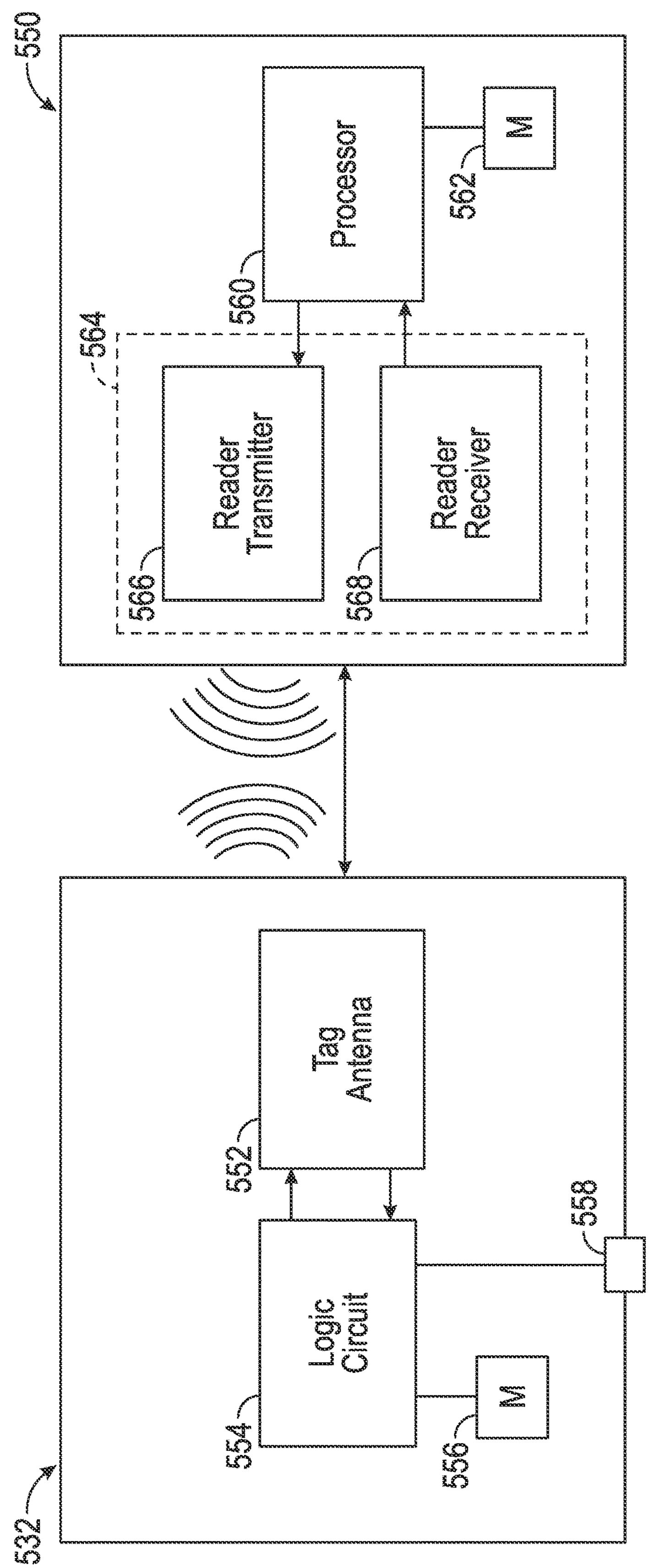
FIG. 7 is a block diagram of a near field communication (NFC) tag and NFC reader device.
Figure 8:
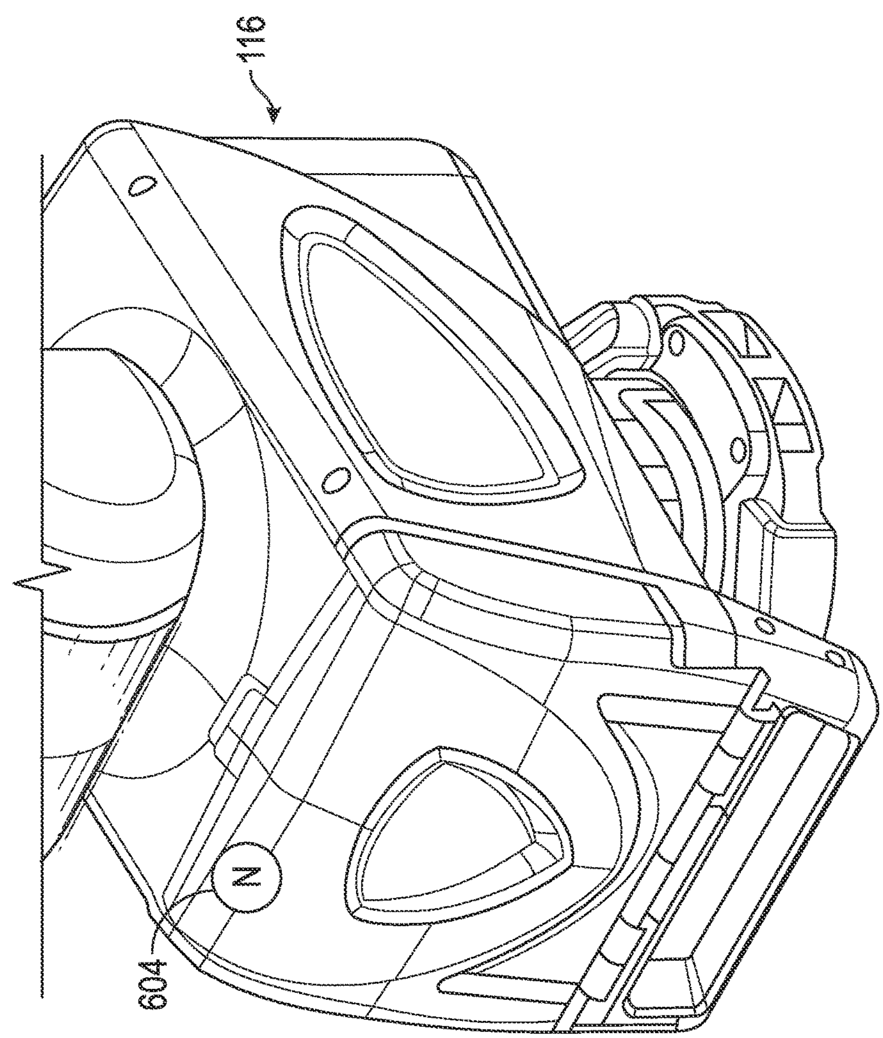
FIG. 8 is a partial schematic perspective view of the AACMM of FIG. 1 communicating with an external device in accordance with an embodiment of the invention.
Figure 8:
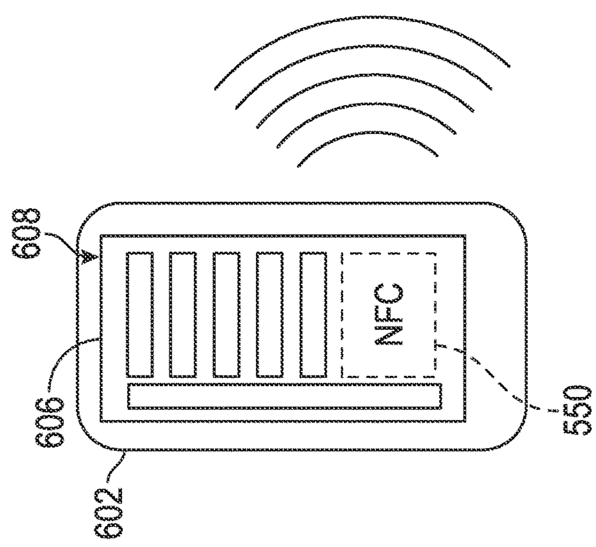
Figure 9:
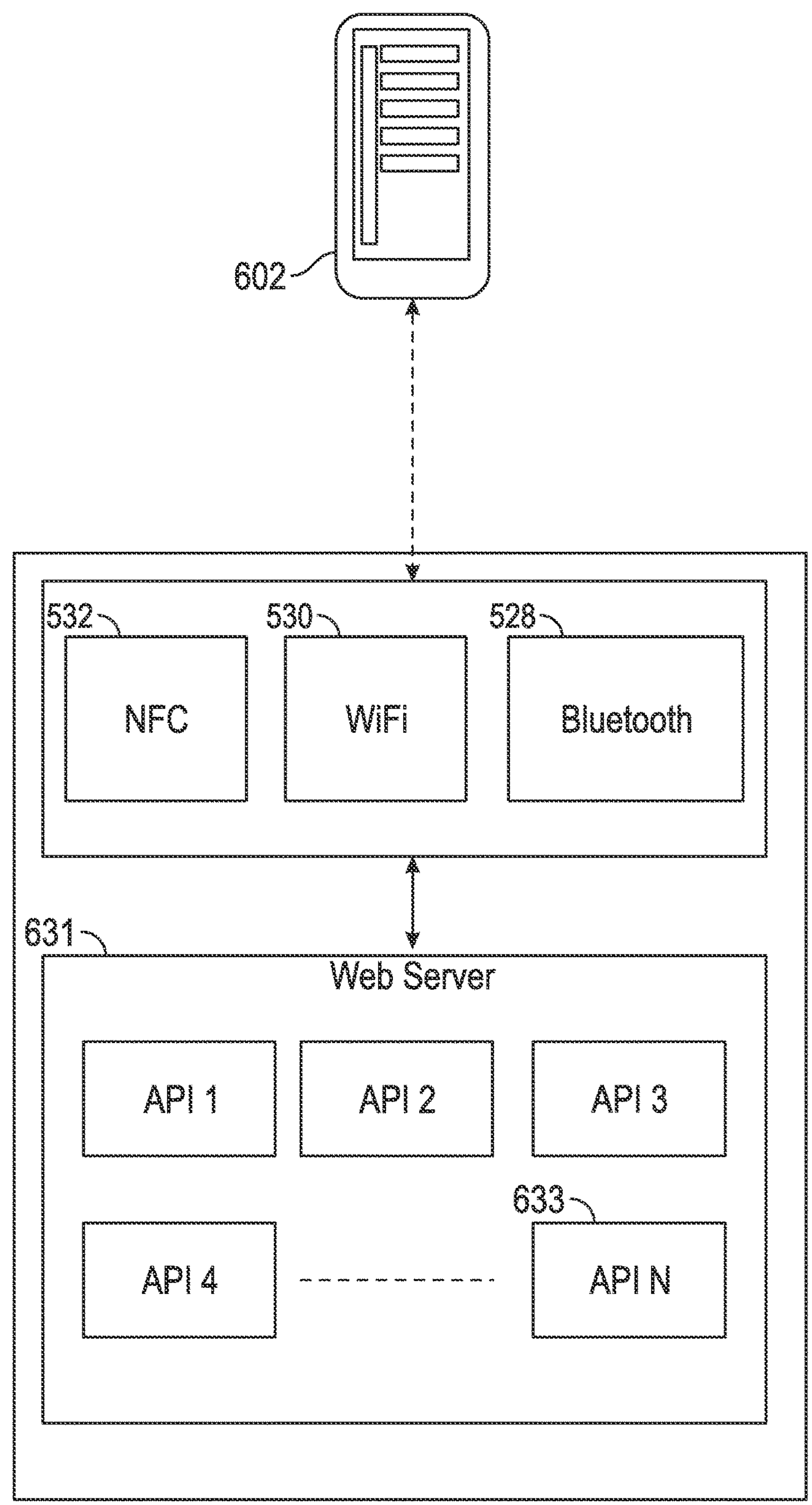
FIG. 9 is a block diagram of the external device of FIG. 8 and a portion of the electronic data processing system of FIG. 7.
Figure 10:
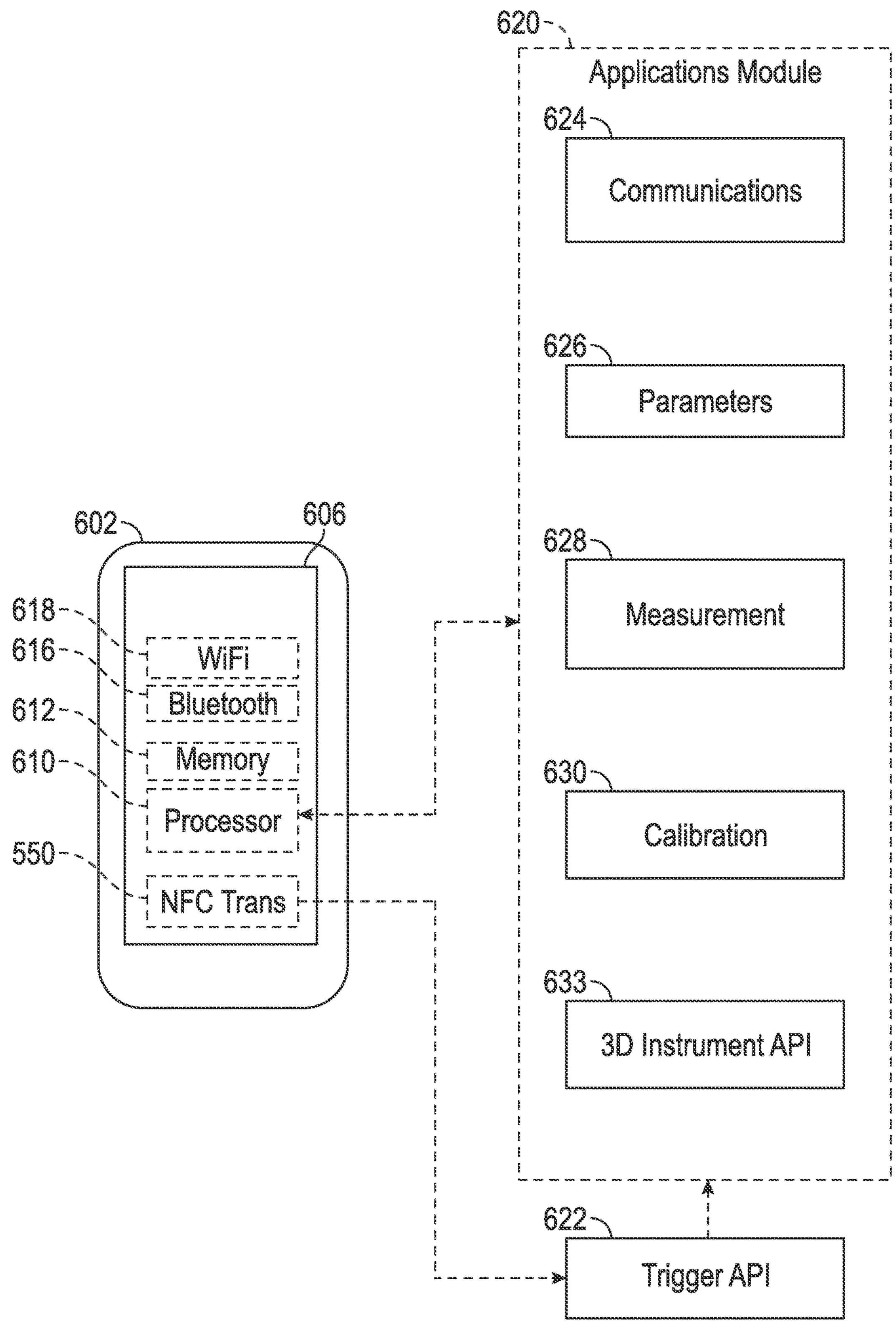
FIG. 10 is a block diagram of the external device of FIG. 8.

FIG. 7 illustrates an embodiment of the NFC module 532 (sometimes colloquially referred to as an NFC tag or listening device) and an NFC reader 550 (sometimes colloquially referred to as a polling device). The term "near field communications" refers to a communications system that allows for a wireless communications between two devices over a short or close range, typically less than 5 inches (127 millimeters). NFC further provides advantages in that communications may be established and data exchanged between the NFC tag 532 and the reader 550 without the NFC tag 532 having a power source such as a battery. To provide the electrical power for operation of the NFC tag 532, the reader emits a radio frequency (RF) field (the Operating Field). Once the NFC tag 532 is moved within the Operating Field, the NFC tag 532 and reader 550 are inductively coupled, causing current flow through an NFC tag antenna 552. The generation of electrical current via inductive coupling provides the electrical power to operate the NFC tag 532 and establish communication between the tag and reader, such as through load modulation of the Operating Field by the NFC tag 532. The modulation may be direct modulation, frequency-shift keying (FSK) modulation or phase modulation, for example. In one embodiment, the transmission frequency of the communication is 13.56 megahertz with a data rate of 106-424 kilobits per second.

In one embodiment, the NFC tag 532 includes a logic circuit 554 that may include one or more logical circuits for executing one or more functions or steps in response to a signal from the antenna 552. It should be appreciated that logic circuit 554 may be any type of circuit (digital or analog) that is capable of performing one or more steps or functions in response to the signal from antenna 552. In one embodiment, the logic circuit 554 may further be coupled to one or more memory devices 556 configured to store information that may be accessed by logic circuit 554. NFC tags may be configured to read and write many times from memory 556 (read/write mode) or may be configured to write only once and read many times from memory 556 (card emulation mode). For example, where only static instrument configuration data is stored in memory 556, the NFC tag may be configured in card emulation mode to transmit the configuration data in response to a reader device 550 being brought within range of the antenna 552.

In addition to the circuits/components discussed above, in one embodiment the NFC tag 532 may also include a power rectifier/regulator circuit, a clock extractor circuit, and a modulator circuit. The Operating Field induces a small alternating current (AC) in the antenna when the reader is brought within range of the tag. The power rectifier and regulator converts the AC to stable DC and uses it to power the NFC tag, which immediately "wakes up" or initiates operation. The clock extractor separates the clock pulses from the Operating Field and uses the pulses to synchronize the logic, memory, and modulator sections of the NFC tag with the NFC reader. The logic circuit separates the 1's and 0's from the Operating Field and compares the data stream with its internal logic to determine what response, if any, is required. If the logic circuit determines that the data stream is valid, it accesses the memory section for stored data. The logic circuit encodes the data using the clock extractor pulses. The encoded data stream is input into the modulator section. The modulator mixes the data stream with the Operating Field by electronically adjusting the reflectivity of the antenna at the data stream rate. Electronically adjusting the antenna characteristics to reflect RF is referred to as backscatter. Backscatter is a commonly used modulation scheme for modulating data on to an RF carrier. In this method of modulation, the tag coil (load) is shunted depending on the bit sequence received. This in turn modulates the RF carrier amplitude. The NFC reader detects the changes in the modulated carrier and recovers the data.

In an embodiment, the NFC tag 532 is a dual-interface NFC tag, such as the aforementioned M24SR series NFC tags for example, having two ports, the antenna 552 for wireless communication and a wired port 558. The wired port 558 may be coupled to transmit and receive signals from the processor 522 for example. In one embodiment, the memory 556 stores the boot load code for the processor 522. As used herein the term "boot load code" or "boot loader code" is a set of computer program instructions that is loaded into the main memory 523 to initiate operation of the operating system on the processor 522 and the electronic data processing system 500. The boot load code stored in NFC tag memory 556 may be a primary boot load code or a secondary boot load code.

It should be appreciated that while embodiments herein disclose the operation of the NFC tag 532 in a passive mode, meaning an initiator/reader device provides an Operating Field and the NFC tag responds by modulating the existing field, this is for exemplary purposes and the claimed invention should not be so limited. In other embodiments, the NFC tag 532 may operate in an active mode, meaning that the NFC tag 532 and the reader device 550 may each generate their own Operating Field. In an active mode, communication is performed by the NFC tag and reader device alternately generating an Operating Field. When one of the NFC tag and reader device is waiting for data, its Operating Field is deactivated. In an active mode of operation, both the NFC tag and the reader device may have its own power supply.

The reader device 550 is a portable or mobile computing device and may be a general computing device, such as a cellular (smart) phone or a tablet computer for example. The reader device 550 includes a processor 560 coupled to one or more memory modules 562. The processor 560 may include one or more logical circuits for executing computer instructions. Coupled to the processor 560 is an NFC radio 564. The NFC radio 564 includes a transmitter 566 that transmits an RF field (the Operating Field) that induces electric current in the NFC tag 532. Where the NFC tag 532 operates in a read/write mode, the transmitter 566 may be configured to transmit signals, such as commands or data for example, to the NFC tag 532.

The NFC radio 564 may further include a receiver 568. The receiver 568 is configured to receive signals from, or detect load modulation of, the Operating Field by the NFC tag 532 and to transmit signals to the processor 560. Further, while the transmitter 566 and receiver 568 are illustrated as separate circuits, this is for exemplary purposes and the claimed invention should not be so limited. In other embodiments, the transmitter 566 and receiver 568 may be integrated into a single module. The antennas being configured to transmit and receive signals in the 13.56 megahertz frequency.

Referring now to FIGS. 1 and 8-10, an embodiment is shown of the AACMM 100 cooperating with a mobile computing device, such as cellular phone 602. The mobile computing device 602 may also be a smart pad, laptop computer, smart music player, or other type of device having a computer processor. It should be appreciated that while the illustrated embodiment is in reference to the AACMM 100, these methods and processes may be similarly applied to other metrology devices, such as the laser tracker 200, the TOF laser scanner 300 and the triangulation scanner 400 for example. In the exemplary embodiment, the cellular phone 602 includes a display 606 that presents a graphical user interface (GUI) 608 to the user. In one embodiment, the GUI 608 allows the user to view data, such as measured coordinate data for example, and interact with the cellular phone 602. In one embodiment, the display 606 is a touch screen device that allows the user to input information and control the operation of the cellular phone 602 using their fingers. The cellular phone 602 further includes a processor 610 (FIG. 10) that is responsive to executable computer instructions and to perform functions or control methods, such as those illustrated in FIGS. 11-14 and 16 for example. The cellular phone 602 may further include memory 612, such as random access memory (RAM) or read-only memory (ROM) for example, for storing application code that is executed on the processor 610 and storing data, such as coordinate data for example. The cellular phone 602 further includes communications circuits, such as near field communications (ISO 14443) circuit 614, Bluetooth (IEEE 802.15.1 or its successors) circuit 550 and WiFi (IEEE 802.11) circuit 618 for example. The communications circuits 614, 616, 618 are transceivers, meaning each is capable of transmitting and receiving signals. It should be appreciated that the cellular phone may include additional components and circuits, such as a cellular communications circuit, as is known in the art.

The cellular phone 602 may further include additional modules or engines 620, which may be in the form of application software or "apps" that execute on processor 610 and may be stored in memory 612. In one embodiment, a trigger module 622 is provided that cooperates with the NFC circuit 550 to activate one or more modules 620 when the NFC circuit 550 is brought within range of another NFC enabled device, such as AACMM 100 for example. In one embodiment, the trigger module 622 initiates the transfer of application program interface (API) code 633 from the metrology device 100 to the cellular phone 602. In one embodiment, the API code 633 may be transmitted by an embedded web server 631 (FIG. 9) in the electronic data processing system 500. In still another embodiment, the trigger module 622 initiates the downloading of an application or module (an "app") from an online store or remote computing server when the desired module is not already installed on the device. The downloaded module then cooperates with the API code 633 to control one or more aspects of the metrology device. This provides advantages in that the size of the downloaded module may be reduced since the API's are stored on the metrology device. The downloaded module could include functionality such as controlling the 3D measuring instrument, collecting data from measurements made by the 3D measuring instruments, and displaying the results of data obtained from the metrology device.

The API code may be specific to the particular metrology device (such as AACMM 100) and specify for the cellular phone 602 how the components or modules 620 interact with each other and the metrology device. It should be appreciated that the API code for an AACMM 100 may be different than that for a laser tracker 200. In one embodiment, the API code specifies a set of functions or routines that accomplish a specific task or are allowed to interact with a specific software component. For example, there may be calls to functions or routines, such as but not limited to: connecting with the metrology device, disconnecting from the metrology device, acquiring a measurement, capturing a point cloud, initiating a compensation process, and acquiring an image for example.

While embodiments herein describe the transfer of API code from the metrology device to the cellular phone 602 when the NFC communication is established, this is for exemplary purposes and the claimed invention should not be so limited. In other embodiments, the API code may be transferred from the metrology device as needed, such as when a user executes an application module for example. In still other embodiments, the API code is transferred by the web server 631 once a WiFi connection is established between the metrology device and the cellular phone 602.

In still other embodiments, the API code is stored in a remote computer server. The remote computer server may be arranged on the local area network or in a distributed/cloud computer network. A computer network may include a wireless network, a hardwire network or a cellular telecommunications network. It should be appreciated that the remote computer server may be comprised of a plurality computers in a distributed computing configuration. Where the API code is stored on a remote computer server, advantages may be gained by allowing for updating of the API code without having to transfer to each individual instrument. Further, API code may be stored/acquired based on the serial number of the metrology device. This provides advantages in allowing the API code to reflect changes in the manufacturing builds be organized efficiently. Further, by establishing communication with the remote computer server, other computing functions such as processing the three-dimensional coordinate data may be performed on the remote computer server.

The module 620 may also include a communications module 624 that establishes communications with the AACMM 100 using Bluetooth circuit 618 or WiFi circuit 618 (e.g. IEEE 802.11) for example. With a Bluetooth circuit 618, the communications module 624 establishes communication directly with the portable computing device. A WiFi circuit 618 on the other hand will communicate with the portable computing device via an access point that connects the WiFi circuit 618 to a local area network. It should be appreciated that the portable computing device may incorporate an access point that allows the transmission of signals directly to the portable computing device via the WiFi circuit 618. The modules 620 may also include a parameters module 626, which allow the operator to change settings and parameters, such as encoder parameters within the electronic data processing system 210 of AACMM 100. For example, the parameters module 626 may allow the changing of the WiFi settings (e.g. power levels, approved networks, service set identifier or SSID). It may also include instrument parameters related with the characteristics of the individual instrument—for example, kinematic model parameters that might be distances, angles, offsets, and so forth.

The module 620 may further include a control or measurement module 628. The measurement module 628 allows the user to issue commands, such as indicating the type of measurement being performed to the AACMM 100. In one embodiment, the measurement module 628 may receive an inspection plan, meaning a series of measurements to be performed, and present the measurements to the user in the order defined by the inspection plan. In one embodiment, an NFC circuit or tag 532 is either attached to the object being inspected or its accompanying documentation. The cellular phone 602 retrieves the inspection plan by placing the NFC module 550 into proximity of the object NFC tag. The NFC tag is powered by the Operating Field generated by the NFC circuit 550 and the inspection plan is transmitted to the cellular phone 602. Finally, in the exemplary embodiment, the module 620 may include a calibration module 630 that provides instructions to the user on carrying out calibration steps for the AACMM 100. The calibration module 630 may also perform calculations to process measurement results obtained from the calibration procedure.

In the exemplary embodiment, the metrology device 100, 200, 300, or 400 may include on the instrument a visual indicator of NFC capability. For example, in an AACMM 100, the visual indicator may be provided on an area 604 of the base 116. In one embodiment, the NFC module 532 or its antenna 552 is located proximate the area 604. To couple the portable computing device 602 to communicate with the AACMM 100, the device 602 is brought in proximity (e.g. less than 5 inches) to the area 604. When within range, the Operating Field generated by the NFC circuit 550 induces current within the NFC module 532 to power the NFC module 532 via inductive coupling. Once powered the NFC module 532 transmits a signal to the device 602 causing the trigger module 622 to initiate operation of one or more modules within the module 620.

Figure 11:
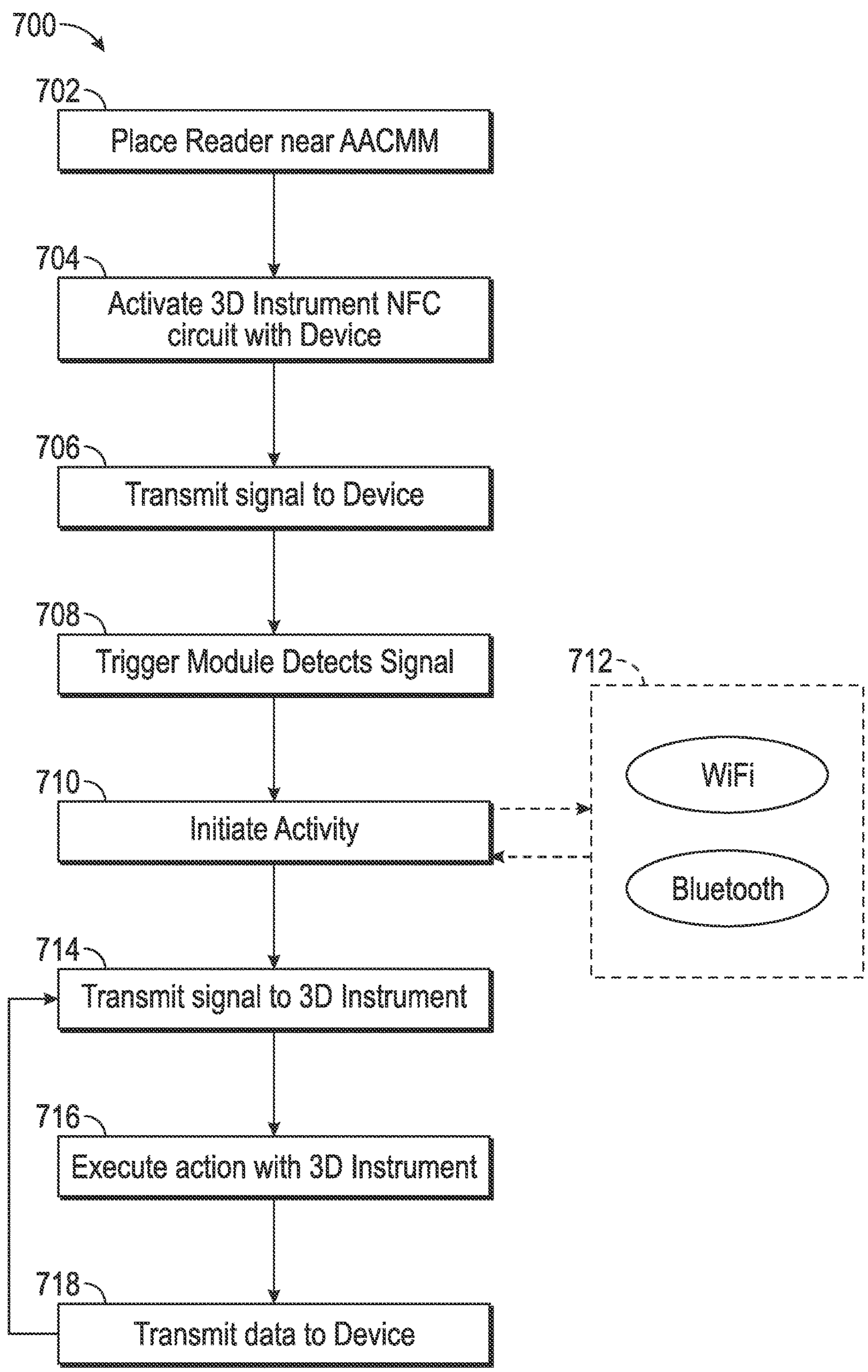
FIGS. 11-14 are flow diagrams of methods of operating the metrology device of FIGS. 1-4 and external device of FIG. 8.

Once the NFC module 550 and the NFC circuit 532 establish communication, this may allow for a series of automated or partially automated functions to occur that facilitate the operation of the metrology device by the user. In the embodiment of FIG. 11, a method 700 is provided that allows the establishment of communications between the portable computing device 602 and the AACMM 100. The method 700 starts in block 702 where the user places the device 602 in proximity to the area 604. The Operating Field created by the NFC circuit 550 induces a current in the NFC module 532 in block 704, and in response a signal is transmitted to the NFC module 550 in block 706, such as by modulation of the Operating Field. The receipt of the signal by the NFC module 550 in block 708 activates the trigger module 622, which executes one or more modules 620, such as the communications module 624 for example. As discussed above, the metrology device may also transmit API code to the device 602.

In block 710, the communication module 624 transmits signals to the NFC module 532 that include parameters to configure in block 712 communication between the device 602 and the metrology device (e.g. AACMM 100) using a communications protocol, such as cellular telecommunications (e.g. LTE), Bluetooth or WiFi, for example, that allows the user to maintain communication between the device 602 and the metrology device at greater distances than is allowed by NFC. This provides advantages in allowing the user to move the device 602 while maintaining communication with the metrology device during the measurement process. Once the communication channels are established, the method 700 proceeds to block 714 where a signal may be transmitted to the metrology device, such as with measurement module 628 for example. A function is executed by the metrology device, such as acquire a coordinate data on an object in block 716. The data is then transmitted to the device 602 in block 718, such as to display the coordinate data on the display 506 for example.

It should be appreciated that the ability to establish communications in a simple manner between the device 602 and the metrology device provides advantages in the set up and operation of the metrology device. For example, where a local area network or wireless network is not available (e.g. a construction site), the establishment of communications via the NFC tag could be used to initiate a process within the cellular phone to establish an ad-hoc WiFi network (e.g. a hotspot) for communication between different metrology devices. Further, this ad-hoc network could use the cellular data telecommunications capability (e.g. LTE) of the cellular phone to transmit and receive data from a remote computer server.

In still further embodiments, the establishment of communications via the NFC tag could be used to coordinate measurements performed by multiple metrology devices. In this embodiment, the device is brought into proximity with each of the metrology devices and establishes communications with each. The device is then used to control the collection of instruments and collect data as needed. In one embodiment, the device is used to determine one or more measurements that utilize data from a plurality of metrology devices.

In still further embodiments, the establishment of communications via the NFC tag could be extended to establish communications with other peripheral equipment and devices, such as robotic device or assembly line machinery for example. In this embodiment, having established communications with the metrology device and the peripheral equipment could quickly and simply establish control and coordination of the operation.

Figure 12:
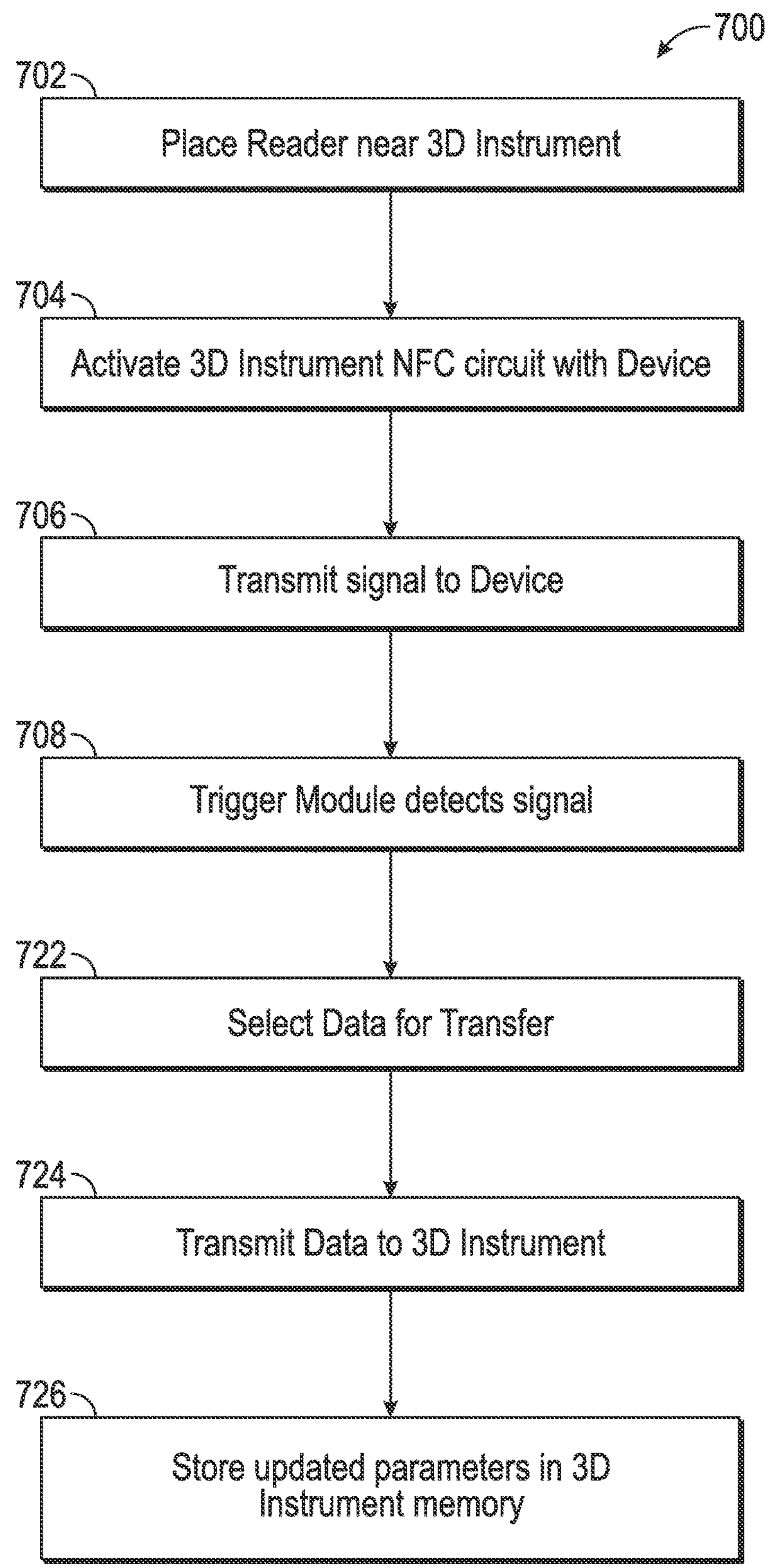

In another embodiment shown in FIG. 12, a method 720 provides for the updating of parameters in the metrology device. In this embodiment, communication between the device 602 and the metrology device is established in blocks 702, 704, 706, 708 as described herein above. In this embodiment, the trigger module 622 may initiate activation of the parameters module 622. With the parameters module 622 operating on the device 602, the user selects or enters the data parameters that need to be updated or changed on the metrology device in block 722. The updated parameters are transmitted to the metrology device in block 724. In one embodiment, the parameters are stored in the metrology device memory 523 in block 726, such as in the NFC module 532 or in memory 556 for example. It should be appreciated that the transfer of parameters from the device 602 to the metrology device may be performed through the NFC communications medium, the Bluetooth communications medium or the WiFi communications medium. For example, a WiFi parameter may include the set-service identifier (SSID) of the wireless network, or the acceptable power output of the WiFi radio. Further, it should be appreciated that when the parameters module 622 is executed, the current settings of metrology device may be transmitted to the device 602 for review by the user prior to updating or changing of the settings. It should be appreciated that this provides advantages in allowing the metrology device to be quickly configured to comply local regulatory requirements. For example different jurisdictions have different output power limitations for wireless communications circuits (e.g. WiFi). Typically manufacturers create different model instruments that are preconfigured to comply with the different regulatory requirements. Embodiments of the present invention provide advantages in allowing the metrology device to be quickly configured, either prior to shipping from the manufacturer or at the location of use via a mobile general purpose computing device, such as a cellular phone.

Figure 13:
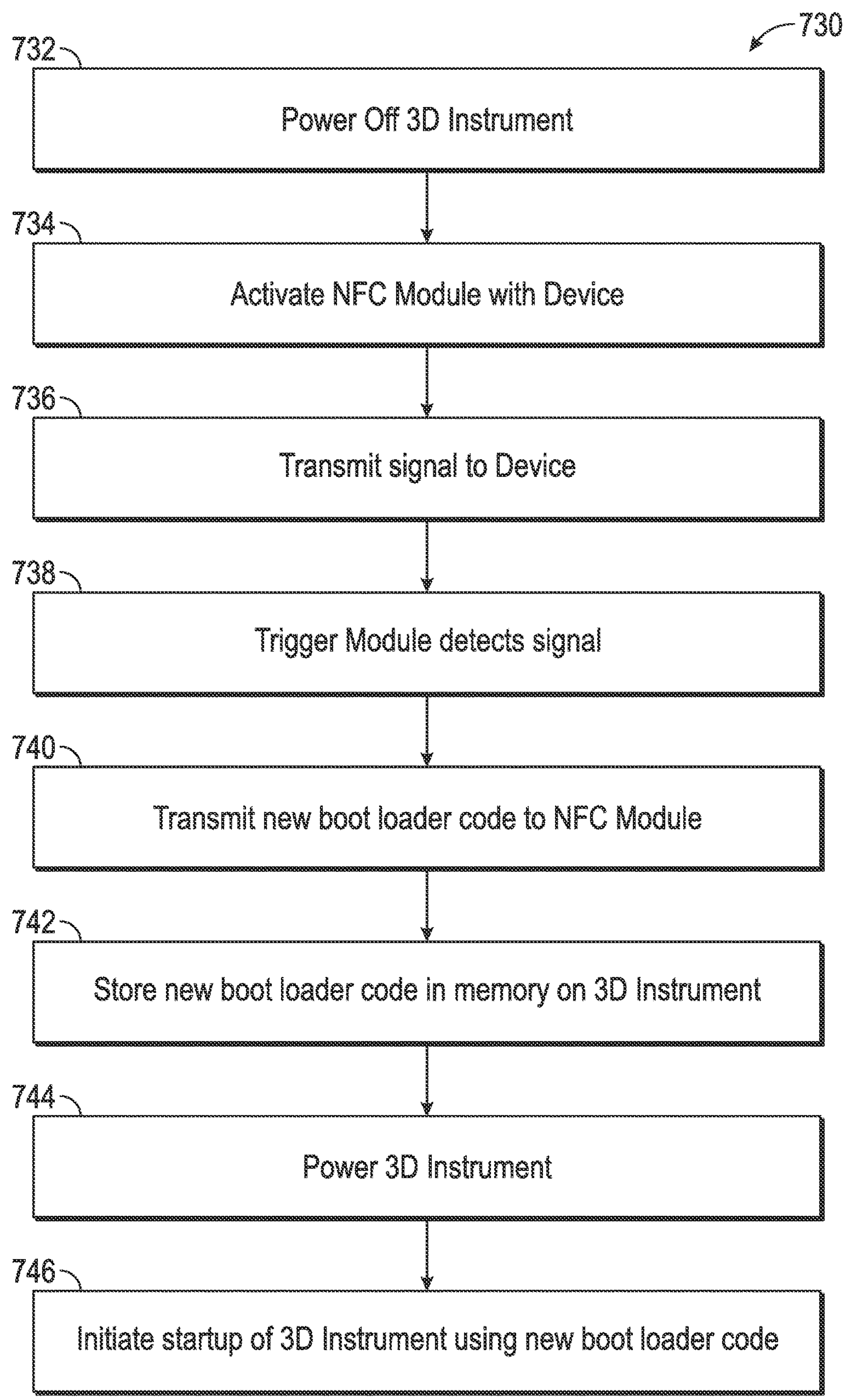

Referring now to FIG. 13, another embodiment is shown for updating the boot load code that initiates operation of the metrology device. In this embodiment, a method 730 starts in block 732 with the metrology device in the powered off state of operation. The method 730 then proceeds to block 734 where the NFC module 532 is activated via inductive coupling as described herein above. When the NFC module 532 is powered, a signal is transmitted to the NFC circuit 550 in block 736. The trigger module 622 initiates the execution of an update module on the device 602 in block 738. The update module transmits to the NFC module 532 the updated boot load code in block 740 and the new boot load code is stored in memory 556 in block 742. It should be appreciated that in this embodiment, the boot load code is stored in the NFC module 532 since the base processor board 502 is unpowered. Therefore, the executable code used by the processor 522 during the initiation or boot process is obtained from the NFC module 532 when the metrology device is powered on in block 744 and booted in block 746. In one embodiment, the memory used in the NFC module 532 is but not limited to universal serial bus, 1-wire, inter-integrated circuit (I2C) or a serial peripheral interface (SPI) types of memory. In one embodiment, the boot load code is a first level code used to initiate or boot the processor 522. In another embodiment, the boot load code is a secondary level code that is executed by the processor 522 after initial activation.

Figure 14:
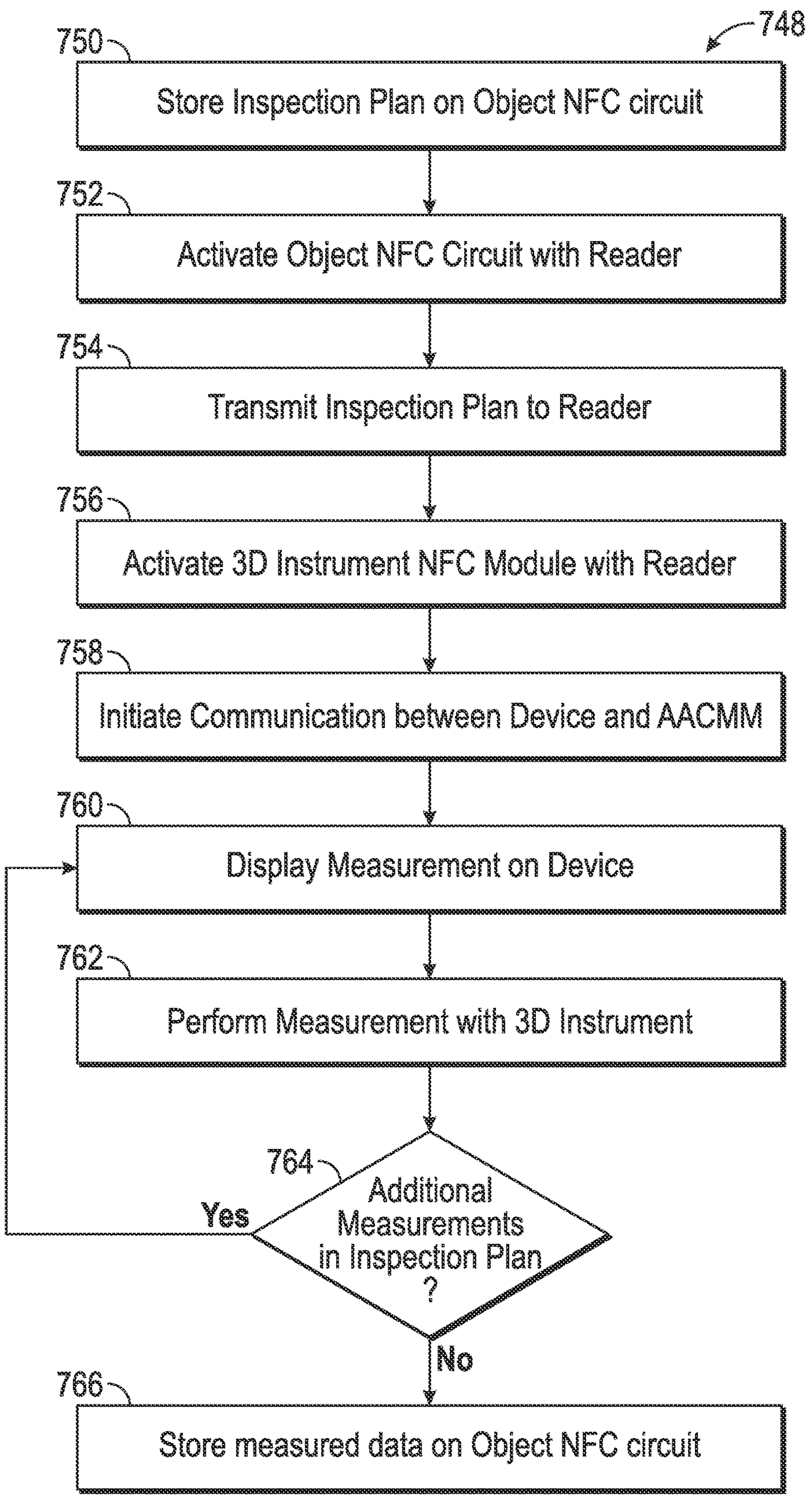

Referring now to FIG. 14, another embodiment is shown of a method 748 for operating the metrology device with the device 602 in accordance with an inspection plan. Method 748 starts in block 750 by storing an inspection plan on an object NFC tag. As used herein, the term "inspection plan" refers to a set or series of measurements that are performed on the object, such as to determine if the object was manufactured within the desired specifications for example. The object NFC tag may be directly coupled to the object (e.g. an adhesive label) or may be coupled to an associated item, such as a bin, a tote, a box, an engineering drawing or other documentation for example. The method 748 then proceeds to block 752 where the object NFC tag is activated by the device 602. The method 748 then transmits the inspection plan to the device 602 in block 754. The user then moves the device 602 in proximity to metrology device and activates the NFC module 532 in block 486 and communication between the device 602 and the metrology device is established in block 758 as described herein above. The device 602 then displays on the display 606 instructions on a measurement, or a series of measurements for the object that the user is to acquire using the metrology device in block 760. In one embodiment, the instructions are displayed sequentially in the order they are to be performed. In another embodiment, the instructions are displayed as a group or list and the user selects the measurements prior to performing the measurement with the metrology device.

The user then performs the measurement (e.g. flatness of a surface, diameter of a hole or surface, etc.) or determines three-dimensional coordinate data in block 762. In query block 764, it is determined whether there are any additional measurements to be performed. If query block 764 returns a positive, the method 748 loops back to block 760 and the next measurement in the inspection plan is displayed and acquired. If query block 764 returns a negative, the method 748 proceeds to block 766 where the acquired data is stored. In some embodiments, the device 602 may download from the web server 631 of the metrology device additional APIs required to complete the inspection plan.

Figure 15:
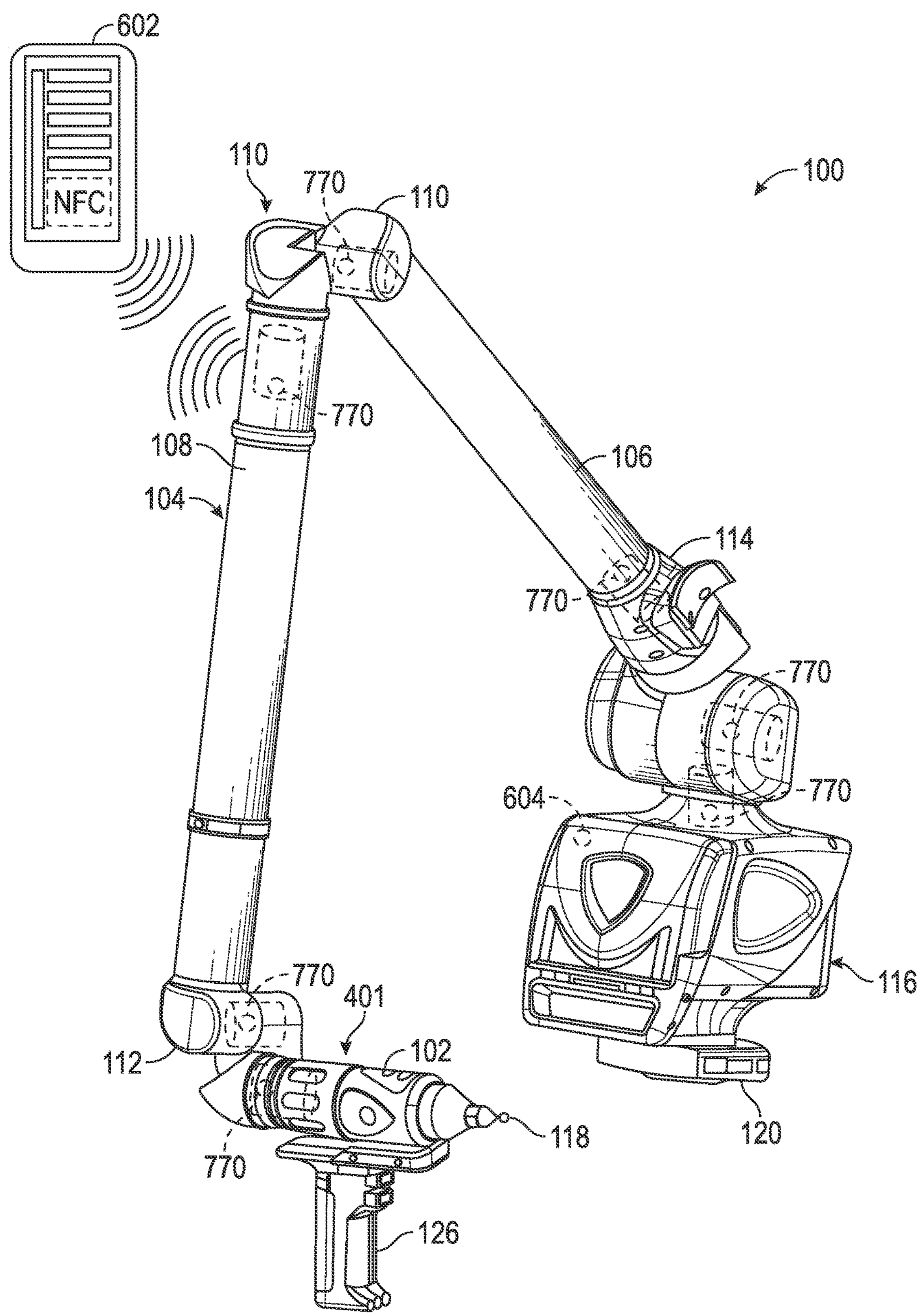
FIG. 15 is a perspective view illustrating of the AACMM of FIG. 1 and external device of FIG. 8 with encoder/bearing cartridges.
Figure 16:
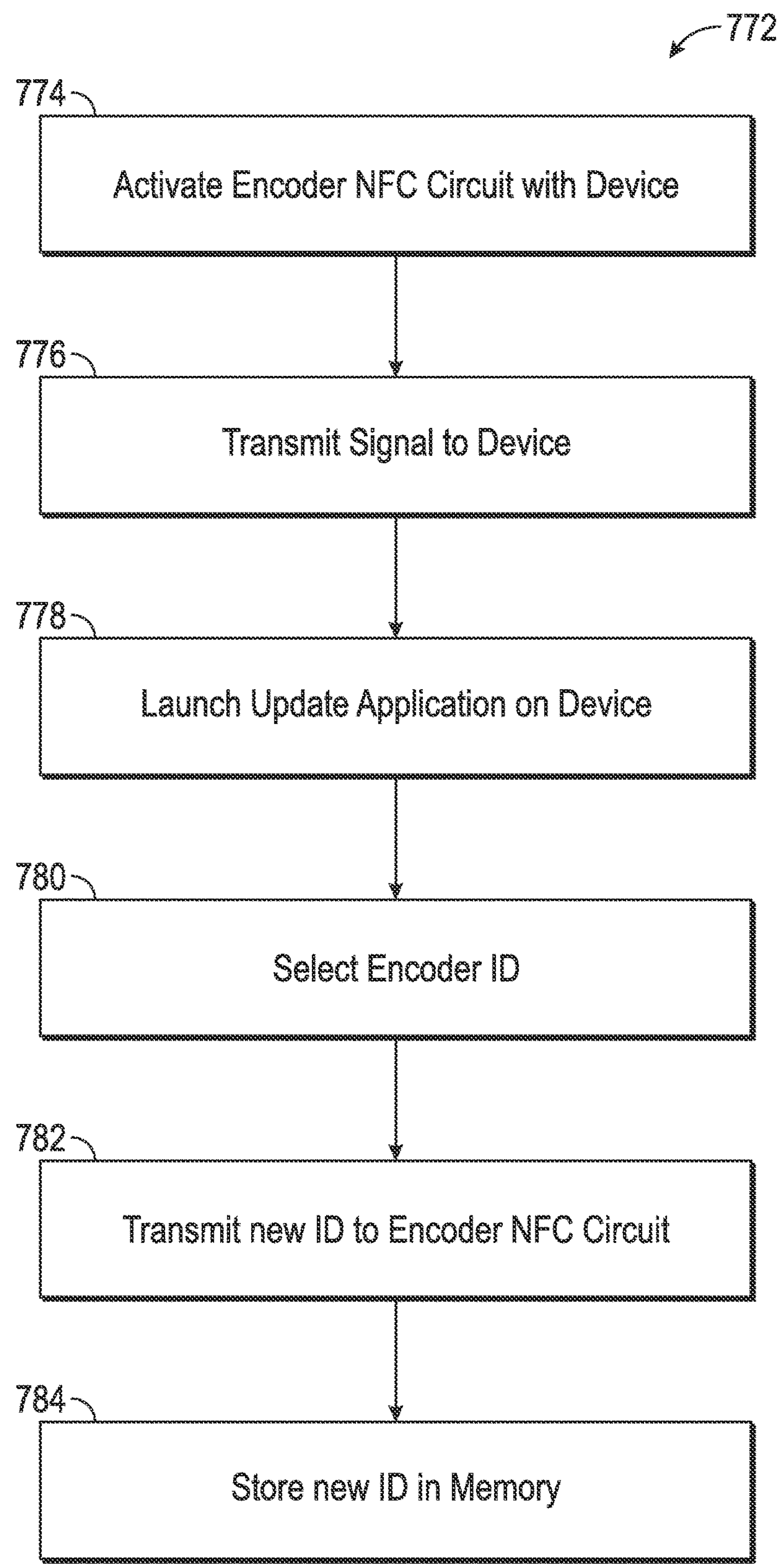
FIG. 16 is a flow diagram of a method of operating the AACMM of FIG. 10.

It should be appreciated that components within the metrology device may incorporate NFC tags. For example, as shown in FIGS. 15-16, in an embodiment, the metrology device is an AACMM 100 and each of the bearing cartridge groupings 110, 112, 114 includes one or more NFC tags 770. As discussed above, each of the bearing cartridge groupings 110, 112, 114 includes one or more rotary encoders that measure the amount of rotation of an axis of a bearing cartridge. These encoders include device data, such as a unique identification number or address relative to the other encoders in the AACMM. This identification number is transmitted with the rotary data to the electronic data processing system 210. In this way, the electronic data processing system 210 may determine which encoder transmitted the positional signal and the 3-D positional calculations may be determined. Further, during the manufacturing process, each of the encoders is measured and calibrated. This calibration data may be utilized by the AACMM 100 in compensating the 3D measurements. Further, by providing an NFC tag 770, the calibration data may be stored with the encoder and therefore more reliably tracked and applied by the AACMM 100.

Typically, in prior art systems, the identification number was assigned to an encoder using a manual dual in-line package (DIP) switch. As a result, when an encoder is replaced, the installer needs to determine identification number or address of the encoder and manually assign the new encoder with the same identification number. In the exemplary embodiment, the identification number for the encoder is stored in the NFC tag 770. Thus, by placing the device 602 adjacent the NFC circuit 500, the operator may determine the identification number of the encoder. Further, in one embodiment, the NFC circuit 770 is a read-write type of NFC circuit. This also provides advantages in allowing the operator to change the identification number of the encoder.

Referring now to FIG. 16, a method 772 for assigning an identification-number/address to an encoder. The method 772 starts with activating the NFC tag 770 with the device 602 in block 774. The NFC tag 500 then transmits a signal to the device 602 in block 776 which causes trigger module 622 to execute an application module on the device 602 for communicating with an NFC tag in block 778. The user selects or enters an encoder identification number using the application module in block 780. The new identification number is transmitted to the NFC tag 770 in block 782. The new identification number is stored in the NFC tag 770 memory in block 784 where it may be accessed by the encoder during operation of the AACMM 100.

Figure 17A:
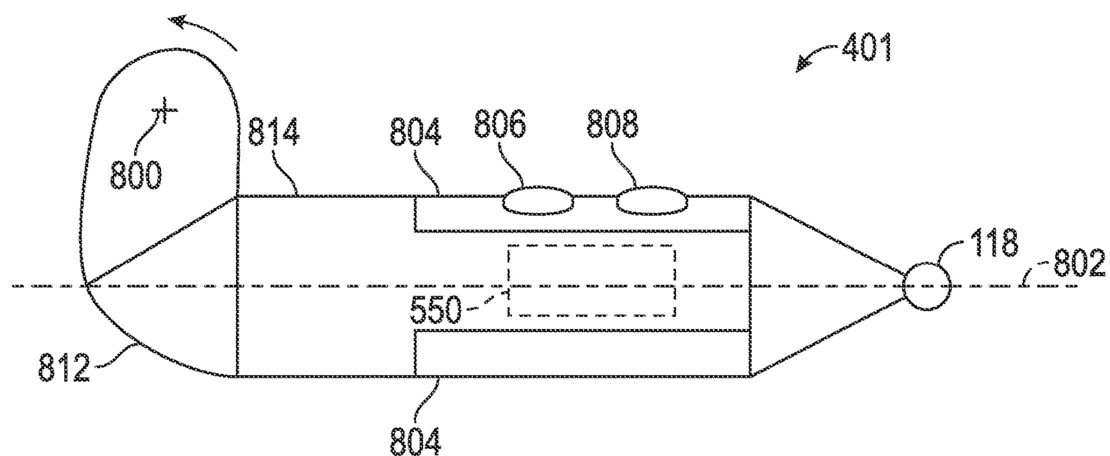
FIGS. 17A and 17B are illustrations of an embodiment of the probe end of the AACMM of FIG. 1 incorporating a powerless switch.
Figure 17B:
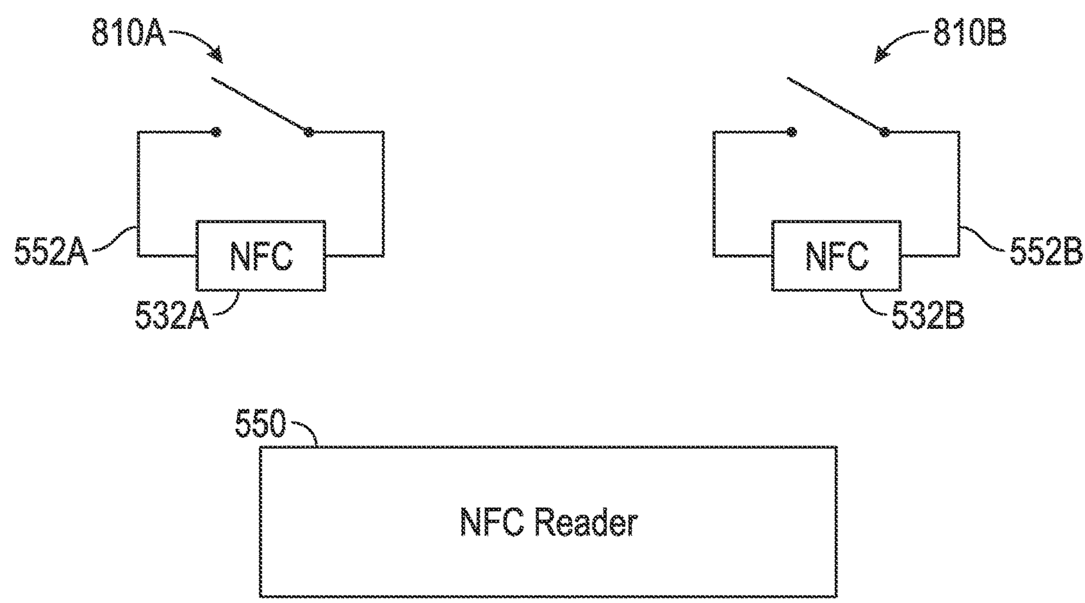

Another exemplary embodiment is shown in FIGS. 17A and 17B of an NFC tag being used with a metrology device, such as AACMM 100, for communicating between two components that move relative to each other. In this embodiment, the AACMM 100 is a six-axis coordinate measurement machine. In a six-axis AACMM, the bearing cartridge 812 only rotates about a single axis 800 and there is no rotation of the probe end 401 about the centerline 802. However, in some embodiments, the probe housing 814 includes a grip portion 804 that freely rotates about the centerline 802. It should be appreciated that this arrangement facilitates the user holding the probe end 401 in a comfortable position during operation. It also facilitates redirecting a beam of light from a line scanner attached to the end of the articulated arm, should one be present. Mounted on the grip portion 804 are one or more actuators 806, 808. These actuators allow the operator to activate different functions of the metrology device, such as taking a measurement for example.

In one embodiment, each actuator 806, 808 includes an NFC tag 532A, 532B coupled to a switch 810A, 810B. The switches 810A, 810B are arranged as part of the antenna circuit 552A, 552B of each NFC tag 532A, 532B. An NFC reader 550 is arranged in the probe housing 102 adjacent the actuators 806, 808, such that NFC reader 550 remains stationary relative to the grip portion 804. In other words, the grip portion, and therefore the actuators 806, 808, rotate about the NFC Reader 550. The switches 810A, 810B are configured to be in a "normally open" position, meaning that the switches 810A, 810B form an open circuit unless the respective actuator 806, 808 is depressed or actuated by the operator. Thus, when the actuators 806, 808 are actuated, the switches 810A, 810B are closed allowing the respective antenna circuits 552A, 552B to be formed.

The NFC reader 550 continuously emits an Operating Field during operation. When the actuators 806, 808 are not actuated by the operator, the open switches 810A, 810B prevent inductive coupling. Thus, the NFC tags 532A, 532B are not powered and no signal is transmitted by the NFC tags 532A, 532B. Once an actuator 806, 808 is actuated, the antenna circuit for the respective NFC tag is closed. The NFC tag then modulates the Operating Field to signal the NFC reader 550 that the actuator has been actuated. As a result, the NFC reader 550 may transmit a signal to the electronic data processing system 206 indicating that the respective actuator 806, 808 has be actuated. It should be appreciated that the coupling of the NFC tags to a movable body member has advantages in allowing signals indicating the activation of an actuator on the movable body member to be transmitted wirelessly without the need for expensive and complicated slip rings. Thus the costs of the AACMM 100 may be reduced while also improving reliability.

It should be appreciated that while embodiments herein describe communication between the AACMM 100 and the portable computing device 602, this is for exemplary purposes and the claimed invention should not be so limited. In another embodiment, the NFC module 532 may be used to couple the AACMM with a portable accessory, such as but not limited to a laser line probe, a laser scanner, or a retroreflector for example. The NFC module 532 may also be used to establish communication with accessories coupled to the probe end 401 for example. The communication between the AACMM 100 and the accessories via the NFC communications medium may allow the AACMM 100 to set parameters or settings within the accessory, or may synchronize the accessory clock with that of the AACMM for example.

It should be appreciated that while embodiments described herein make reference to an AACMM, the claimed invention should not be so limited. In other embodiments, the NFC circuits may be used with other metrology instructions, such as but not limited to laser trackers, laser scanners and laser line probes for example. In one embodiment, an NFC circuit may be implemented in a laser tracker and a retroreflector to allow the serial number of the retroreflector to be automatically associated with data acquired by the laser tracker for example.

In accordance with an embodiment, a metrology device is provided. The metrology device including a housing and a measurement device operably coupled to the housing. The measurement device being configured to measure an object. A wireless communications device operably is coupled to the housing, the wireless communications device having an antenna, an electrical circuit and a first memory. The electrical circuit and the antenna being configured to cooperate to modulate an operating field generated by an external device, wherein the electrical circuit is configured to receive a first data from the external device and store the received first data in the first memory. The electrical circuit is further configured to transmit a second data to the external device through the modulation of the operating field. An electronic processing system is operably coupled to the measurement device. The electronic processing system is configured to determine three-dimensional (3D) coordinates of at least one point on a surface of the object based at least in part on a measurement of the object by the measurement device.

In accordance with another embodiment, the electrical circuit is configured to modulate the operating field using a modulation scheme selected from the group consisting of: direct modulation, frequency-shift keying modulation, and phase modulation. In an embodiment, the antenna is configured to receive signals from the external device when the external device is within 127 millimeters of the antenna. In an embodiment, the electronic processing system is electrically coupled to the to the wireless communications device via a port, wherein the electronic processing system is configured to receive a signal from the first memory and change an operating parameter of the metrology device in response. In an embodiment, a power source operably coupled to selectively provide electrical power to the electronic processing system, wherein the wireless communications device is configured to receive data from and transmit data to the external device when the power source is not providing electrical power to the electronic processing system.

In an embodiment, the wireless communications device is further configured to generate a second operating field, the second operating field being configured to transmit signals from the wireless communications device to the external device. In an embodiment, the external device is a portable computing device, the portable computing device including: a processor; a second memory electrically coupled to the processor; a receiver electrically coupled to the processor, the receiver being configured to detect the modulation of the operating field by the wireless communications device; and a transmitter electrically coupled to the processor.

In an embodiment the metrology device includes a trigger module stored in the second memory. A second module is stored in the second memory. The processor is responsive to executable instructions for executing the trigger module in response to the receiver detecting the modulation of the operating field. The trigger module is configured to activate the second module. In an embodiment, the second module is configured to transmit an application program interface (API) signal through the transmitter to the wireless communication device, and wherein the wireless communication device transmits an API module from the first memory to the portable computing device in response to receiving the API signal. In an embodiment, the second module is configured to transmit an API signal through the transmitter to the wireless communication device, and wherein the electronic processing system further includes an embedded web server, the embedded web server being configured to transmit to the portable computing device an API module in response to the wireless communication device receiving the API signal. In an embodiment, the second module is configured to transmit a third signal to a remote server and download a third module from the remote server. In an embodiment, the processor is responsive to executable instructions to determine when the third module is stored in the second memory prior to transmitting the third signal. In an embodiment, the third module is configured to perform functionality selected from the group comprising: controlling the 3D measuring instrument, collecting data from measurements made by the 3D measuring instrument, and displaying the results of data obtained from the metrology device.

In accordance with another embodiment of the invention, a method is provided. The method including the steps of: providing a metrology device having a housing and a measurement device operably coupled to the housing, the measurement device configured to measure an object, the metrology device further having a wireless communications circuit having an antenna, an electrical circuit and a memory, the metrology device still further having an electronic processing system operably coupled to the measurement device and configured to determine 3D coordinates of at least one point on the object based on a measurement by the measurement device; providing a portable computing device having a processor, a second memory, a transmitter, and a receiver; transmitting an operating field with the transmitter; moving the portable computing device within a predetermined distance of the wireless communications circuit;

receiving the operating field with the antenna; receiving at the electrical circuit a first signal from the antenna in response to receiving the operating field; and modulating the operating field with the antenna to transmit data from the electrical circuit to the receiver.

In an embodiment, the method further comprises transmitting a second signal from the electrical circuit to the electronic processing system in response to receiving the operating field; and changing an operating parameter of the metrology device in response to receiving the second signal. In an embodiment, the method may further comprising stopping the flow of electrical power from a power supply to the electronic data processing system prior to receiving the first signal. In an embodiment, the method may further comprise activating a trigger module on the portable computing device in response to receiving the modulated operating field with the receiver; and activating a second module on the portable computing device with the trigger module.

In an embodiment, the method may further comprise: transmitting an API signal from the transmitter with the operating field; receiving the API signal at the electrical circuit; modulating the operating field to transmit with the electrical circuit an API module from the memory; and receiving with the receiver the API module.

In an embodiment, the method may still further comprise: transmitting an API signal from the transmitter with the operating field; receiving the API signal at the electrical circuit; transmitting a second signal to the electronic processing system with the electrical circuit; activating an embedded web server in the electronic processing system; and transmitting an API module from the embedded web server to the processor. In an embodiment, the method may also comprise: transmitting a third signal to a remote server with the second module in response to activating second module; and transmitting a third module from the remote server to the processor in response to the third signal. The third module is configured to perform a step selected from the group comprising: controlling the 3D measuring instrument, collecting data from measurements made by the 3D measuring instrument, and displaying the results of data obtained from the metrology device. In an embodiment, the third module is an API module.

Technical effects and benefits include facilitating communication between a metrology device and a portable computing device. Still further technical effects and benefits include the updating or changing of application modules or API modules on the portable computing device to allow the portable computing device to control or receive data from the metrology device.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

I claim:

1. A metrology device comprising:

a housing;

a measurement device operably coupled to the housing and configured to measure an object;

a wireless communications device operably coupled to the housing, the wireless communications device having an antenna, an electrical circuit and a first memory, the electrical circuit and the antenna being configured to cooperate to modulate an operating field generated by an external device, wherein the electrical circuit is configured to receive a first data from the external device and store the received first data in the first memory, the electrical circuit further configured to transmit a second data to the external device through the modulation of the operating field;

an electronic processing system operably coupled to the measurement device, the electronic processing system being configured to determine three-dimensional (3D) coordinates of at least one point on a surface of the object based at least in part on a measurement of the object by the measurement device.

2. The metrology device of claim 1 wherein the electrical circuit is configured to modulate the operating field using a modulation scheme selected from the group consisting of: direct modulation, frequency-shift keying modulation, and phase modulation.

3. The metrology device of claim 1 wherein the antenna is configured to receive signals from the external device when the external device is within 127 millimeters of the antenna.

4. The metrology device of claim 1 wherein the electronic processing system is electrically coupled to the to the wireless communications device via a port, wherein the electronic processing system is configured to receive a signal from the first memory and change an operating parameter of the metrology device in response.

5. The metrology device of claim 1 further comprising a power source operably coupled to selectively provide electrical power to the electronic processing system, wherein the wireless communications device is configured to receive data from and transmit data to the external device when the power source is not providing electrical power to the electronic processing system.

6. The metrology device of claim 1 wherein the wireless communications device is further configured to generate a second operating field, the second operating field being configured to transmit signals from the wireless communications device to the external device.

7. The metrology device of claim 1 wherein the external device is a portable computing device, the portable computing device including:

a processor;

a second memory electrically coupled to the processor;

a receiver electrically coupled to the processor, the receiver being configured to detect the modulation of the operating field by the wireless communications device; and a transmitter electrically coupled to the processor.

8. The metrology device of claim 7 further comprising:

a trigger module stored in the second memory, a second module stored in the second memory;

wherein the processor is responsive to executable instructions for executing the trigger module in response to the receiver detecting the modulation of the operating field; and wherein the trigger module is configured to activate the second module.

9. The metrology device of claim 8 wherein the second module is configured to transmit an application program interface (API) signal through the transmitter to the wireless communications device, and wherein the wireless communications device transmits an API module from the first memory to the portable computing device in response to receiving the API signal.

10. The metrology device of claim 8 wherein the second module is configured to transmit an API signal through the transmitter to the wireless communications device, and wherein the electronic processing system further includes an embedded web server, the embedded web server being configured to transmit to the portable computing device an API module in response to the wireless communications device receiving the API signal.

11. The metrology device of claim 8 wherein the second module is configured to transmit a third signal to a remote server and download a third module from the remote server.

12. The metrology device of claim 11 wherein the processor is responsive to executable instructions to determine when the third module is stored in the second memory prior to transmitting the third signal.

13. The metrology device of claim 12 wherein the third module is configured to perform a function selected from the group comprising: controlling the 3D measuring instrument, collecting data from measurements made by the 3D measuring instrument, and displaying the results of data obtained from the metrology device.

14. The metrology device of claim 1 wherein the measurement device is selected from the group comprising: an articulated arm coordinate measurement machine (AACMM), a laser tracker, a laser scanner and a triangulation scanner.

15. A method comprising:

providing a metrology device having a housing and a measurement device operably coupled to the housing, the measurement device configured to measure an object, the metrology device further having a wireless communications circuit having an antenna, an electrical circuit and a memory, the metrology device still further having an electronic processing system operably coupled to the measurement device and configured to determine 3D coordinates of at least one point on the object based on a measurement by the measurement device;

providing a portable computing device having a processor, a second memory, a transmitter, and a receiver;

transmitting an operating field with the transmitter;

moving the portable computing device within a predetermined distance of the wireless communications circuit;

receiving the operating field with the antenna;

receiving at the electrical circuit a first signal from the antenna in response to receiving the operating field; and modulating the operating field with the antenna to transmit data from the electrical circuit to the receiver.

16. The method of claim 15 further comprising:

transmitting a second signal from the electrical circuit to the electronic processing system in response to receiving the operating field; and changing an operating parameter of the metrology device in response to receiving the second signal.

17. The method of claim 15 further comprising stopping a flow of electrical power from a power supply to the electronic processing system prior to receiving the first signal.

18. The method of claim 15 further comprising:

activating a trigger module on the portable computing device in response to receiving the modulated operating field with the receiver; and activating a second module on the portable computing device with the trigger module.

19. The method of claim 18 further comprising:

transmitting an API signal from the transmitter with the operating field;

receiving the API signal at the electrical circuit;

modulating the operating field to transmit with the electrical circuit an API module from the memory; and receiving with the receiver the API module.

20. The method of claim 18 further comprising:

transmitting an API signal from the transmitter with the operating field;

receiving the API signal at the electrical circuit;

transmitting a second signal to the electronic processing system with the electrical circuit;

activating an embedded web server in the electronic processing system; and transmitting an API module from the embedded web server to the processor.

21. The method of claim 18 further comprising:

transmitting a third signal to a remote server with the second module in response to activating the second module; and transmitting a third module from the remote server to the processor in response to the third signal.

22. The method of claim 21 wherein the third module is configured to perform a step selected from the group comprising: controlling the 3D measuring instrument, collecting data from measurements made by the 3D measuring instrument, and displaying the results of data obtained from the metrology device.

23. The method of claim 21 wherein the third module is an API module.

* * * * *